United States Patent
Hiramoto

[19]

[11] Patent Number: 6,092,011
[45] Date of Patent: Jul. 18, 2000

[54] APPARATUS AND METHOD FOR CONTROLLING DAMPING FORCE CHARACTERISTIC OF VEHICULAR SHOCK ABSORBER

[75] Inventor: Michiya Hiramoto, Yokohama, Japan

[73] Assignee: Unisia Jecs Corporation, Atsughi, Japan

[21] Appl. No.: 09/053,046

[22] Filed: Apr. 1, 1998

[30] Foreign Application Priority Data

Apr. 8, 1997 [JP] Japan ..................................... 9-089178

[51] Int. Cl.⁷ ........................ B60G 25/00; B60G 17/015; B60G 11/32; B60G 17/00; G06F 17/00
[52] U.S. Cl. ............................ 701/37; 701/91; 701/48; 701/72; 701/75; 701/76; 280/5.5; 280/5.505; 280/5.507
[58] Field of Search ................................. 701/37, 48, 75, 701/72, 76, 91; 280/5.5, 5.505, 5.507

[56] References Cited

U.S. PATENT DOCUMENTS

| | | | |
|---|---|---|---|
| 5,189,615 | 2/1993 | Rubel et al. | 364/424.05 |
| 5,243,525 | 9/1993 | Tsutsumi et al. | 701/37 |
| 5,324,066 | 6/1994 | Masamura et al. | 280/5.519 |
| 5,467,280 | 11/1995 | Kimura | 701/37 |
| 5,485,377 | 1/1996 | Sasaki et al. | 701/14 |
| 5,490,068 | 2/1996 | Shimizu et al. | 701/38 |
| 5,495,418 | 1/1996 | Wolf et al. | 364/424.01 |
| 5,510,985 | 4/1996 | Yamaoka et al. | 701/37 |
| 5,559,701 | 9/1996 | Shimizu et al. | 364/424.05 |
| 5,570,289 | 10/1996 | Stacey et al. | 701/37 |
| 5,638,275 | 6/1997 | Sasaki et al. | 364/424.047 |
| 5,642,899 | 7/1997 | Inoue et al. | 280/5.515 |
| 5,781,873 | 7/1998 | Sasaki | 701/37 |
| 5,794,168 | 8/1998 | Sasaki et al. | 701/37 |
| 5,802,478 | 9/1998 | Iwasaki | 701/37 |
| 5,802,486 | 9/1998 | Uchiyama | 701/37 |
| 5,808,890 | 9/1998 | Mitsuo | 701/37 |
| 5,810,384 | 9/1998 | Iwasaki et al. | 280/5.515 |
| 5,893,896 | 4/1999 | Imamura et al. | 701/70 |
| 5,911,768 | 6/1999 | Sasaki | 701/38 |
| 5,935,181 | 8/1999 | Iwasaki | 701/37 |
| 5,944,763 | 8/1999 | Iwasaki | 701/37 |

FOREIGN PATENT DOCUMENTS

| | | |
|---|---|---|
| 39 30 555 | 1/1991 | Germany . |
| 41 36 224 | 8/1992 | Germany . |
| 42 25 855 | 2/1993 | Germany . |
| 8-58333 | 3/1996 | Japan . |

Primary Examiner—William A. Cuchlinski, Jr.
Assistant Examiner—Olga Hernandez
Attorney, Agent, or Firm—Foley & Lardner

[57] ABSTRACT

A damping force characteristic variable type shock absorber which takes a mode of operation into a first mode, a second mode, a third mode, and a fourth mode is connected to a damping force characteristic basic mode switching block and a damping force characteristic special mode switching block. This first mode is such that when the vehicular vertical direction determined by the vehicular vertical behavior determinator is upward, an extension phase provides a relatively high damping force characteristic and a compression phase provides a relatively low damping force characteristic. The second mode is such that when the vehicular vertical direction determined by the vehicular vertical behavior determinator is downward, the extension phase provides a relatively low damping force characteristic and the compression phase provides a relatively highly damping force characteristic. The third mode is such that when the vehicular vertical behavior determinator is neither upward nor downward, both of extension and compression phases provide the relatively low damping force characteristics. The fourth mode is such that when a predetermined condition of a vehicular motion is satisfied, the damping force characteristics in both extension and compression phases are relatively high.

18 Claims, 13 Drawing Sheets

FIG.6

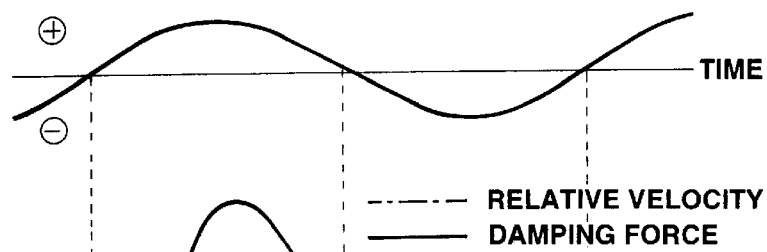
FIG.11A
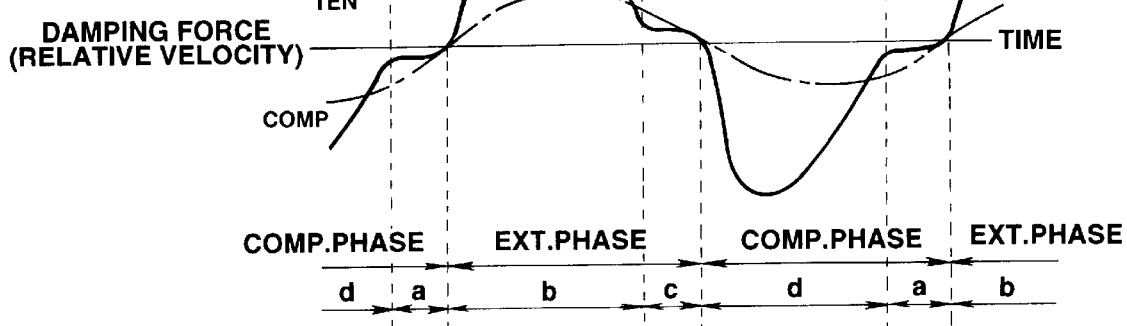
FIG.11B
DAMPING FORCE
(RELATIVE VELOCITY)
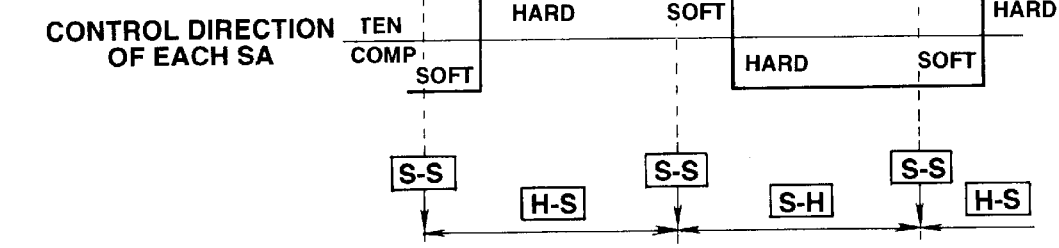
FIG.11C
CONTROL DIRECTION
OF EACH SA
FIG.11D
DRIVE SIGNAL OF
STEPPING MOTOR
(TARGET DAMPING
FORCE CHARACTERISTIC
POSITION P)
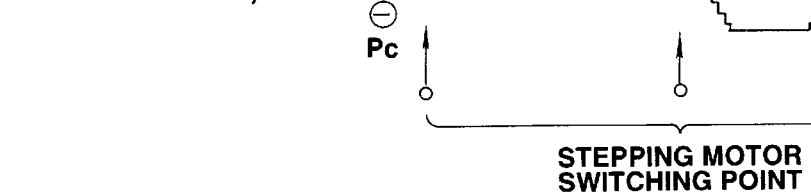

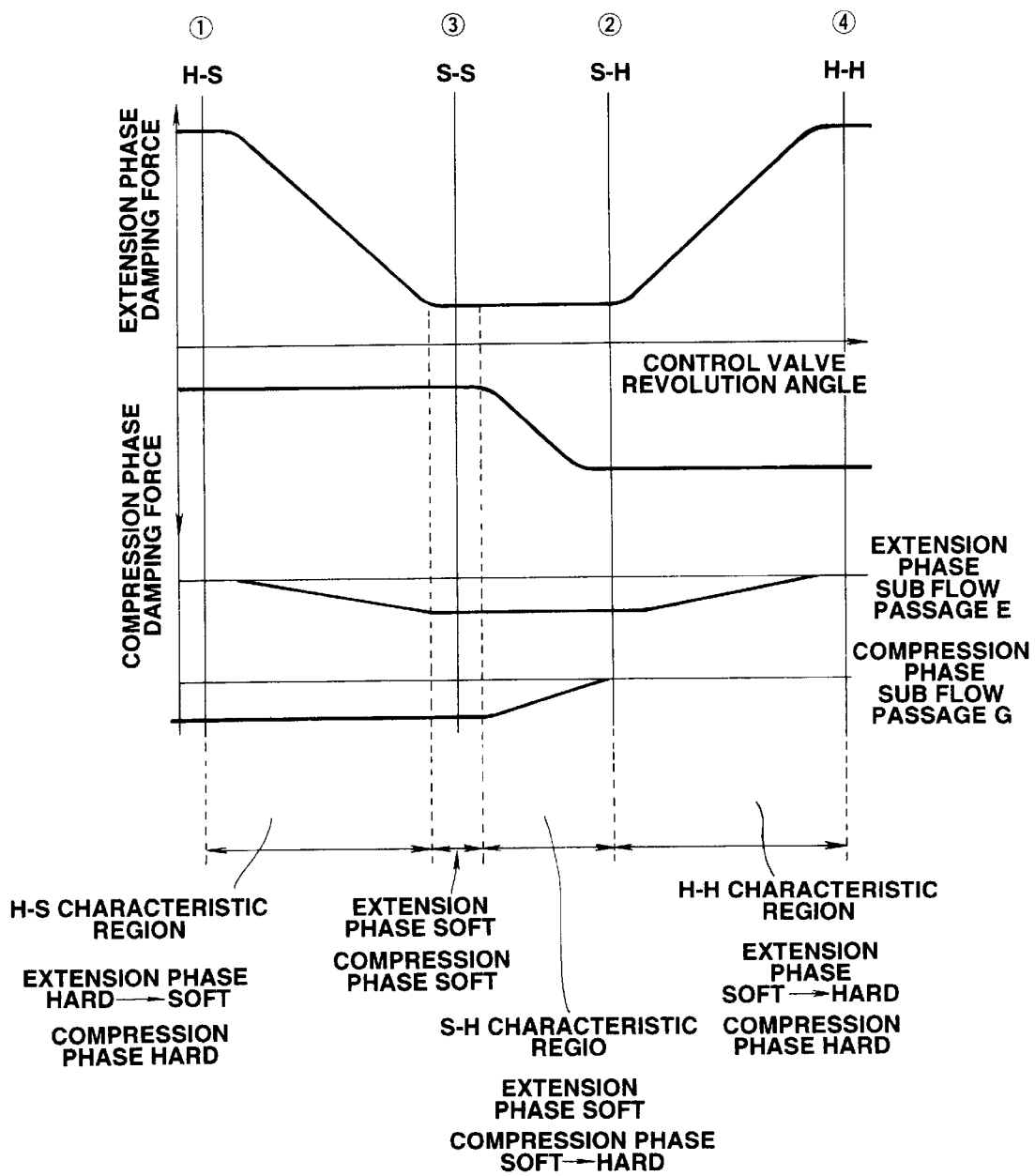

APPARATUS AND METHOD FOR CONTROLLING DAMPING FORCE CHARACTERISTIC OF VEHICULAR SHOCK ABSORBER

BACKGROUND OF THE INVENTION a) Field of the invention

The present invention relates to apparatus and method for controlling optimally damping force characteristics for at least one vehicular shock absorber or respective vehicular shock absorbers mounted between a sprung mass of a vehicle body and an unsprung mass of corresponding vehicular road wheels.

b) Description of the related art

In a previously proposed vehicular suspension control system, a damping force characteristic variable type shock absorber is incorporated in which damping force characteristics in an extension phase and in a compression phase are controlled independently of each other by means of a pivotal movement of a control valve installed therein.

Such a damping force characteristic variable type as described above is exemplified by a Japanese Patent Application First Publication No. Heisei 8-58333 published on Mar. 5, 1996.

That is to say, the damping force characteristic variable type shock absorber disclosed in the above identified Japanese Patent Application First Publication is so constructed and arranged as to be enabled to change into three modes of damping force characteristics; a first mode in which a damping force in an extension phase becomes large (hard) and a damping force in a compression phase becomes small (soft); a second mode in which the damping force in the extension phase becomes small and that in the compression phase becomes large; and a third mode in which that in the extension phase becomes middle (between the hard damping force characteristic of the soft damping force characteristic) and that in the compression phase becomes middle (between the hard damping force characteristic and the soft characteristic).

SUMMARY OF THE INVENTION

However, in the previously proposed vehicular suspension control system using the damping force characteristic variably type described in the BACKGROUND OF THE INVENTION, during a slalom maneuver of the vehicle in which the previously proposed damping force characteristic control apparatus is mounted, both of rightward and leftward vehicle body portions toward which a rolling behavior is directed are continuously shifted therebetween in a very short time.

Hence, to suppress this rolling behavior, it is necessary to change alternatingly the damping force characteristic mode between the first mode and the second mode according to the shift of the rolling vehicular behavior direction. At this time, a time is required to shift the damping force characteristic control with respect to an actual rolling behavior of the vehicle. Thus, an insufficiency of suppression against a transient rolling behavior especially during the slalom maneuver of the vehicle is easy to occur.

In addition, an insufficiency of the damping force characteristic during a high-speed run of the vehicle may cause an incapability of the damping force with an assurance of a steering stability.

It is therefore an object to provide apparatus and method for controlling damping force characteristics of at least one vehicular damping force characteristic variable type shock absorber or a plurality of vehicular damping force characteristic variable type shock absorbers which can suppress the transient rolling behavior and can cope with the assurance of the steering stability during the high-speed run of the vehicle.

According to one aspect of the present invention, there is provided with an apparatus for an automotive vehicle, comprising:

at least one shock absorber intervened between a sprung mass of a vehicle body and an unsprung mass of a corresponding road wheel and so arranged and constructed as to take a first mode of operation such as to provide a relatively high damping force characteristic for a damping force characteristic in an extension phase thereof while providing a relatively low damping force characteristic in a compression phase thereof, a second mode of operation such as to provide the relatively high damping force characteristic for the damping force characteristic in the compression phase while providing the relatively low damping force characteristic for the damping force characteristic in the extension phase, a third mode of operation such as to provide the relatively low damping force characteristics for the damping force characteristics in both of the extension and compression phases, and a fourth mode of operation such as to provide the relatively high damping force characteristics in both of the extension and compression phases;

a vehicular vertical behavior determinator for determining a vertical behavior of the sprung mass of the vehicle body;

a damping force characteristic basic mode switching block for determining a direction of the determined vertical behavior of the vehicle body, for switching a present mode of operation of the shock absorber into the first mode of operation when the direction of the determined vertical behavior is upward, for switching the present mode of operation of the shock absorber into the second mode when the direction of the determined vertical behavior is downward, and for switching the present mode of operation into the third mode when the direction of the determined vertical behavior is neither upward nor downward; and a damping force characteristic special mode switching block for switching the present mode of operation of the shock absorber into the fourth mode of operation when a predetermined condition on a vehicular behavior is satisfied.

According to another aspect of the present invention, there is provided with an apparatus for an automotive vehicle, comprising: a plurality of at least one shock absorber, each shock absorber being intervened between a sprung mass of a vehicle body and a corresponding one of front left and right road wheels and rear left and right road wheels of the vehicle and so arranged and constructed as to take a first mode of operation such as to provide a relatively high damping force characteristic for a damping force characteristic in an extension phase thereof while providing a relatively low damping force characteristic in a compression phase thereof, a second mode of operation such as to provide the relatively high damping force characteristic for the damping force characteristic in the compression phase while providing the relatively low damping force characteristic for the damping force characteristic in the extension phase, a third mode of operation such as to provide the relatively low damping force characteristics for the damping force characteristics in both of the extension and compression phases, and a fourth mode of operation such as to provide the relatively high damping force characteristics in both of the extension and compression phases;

a vehicular vertical behavior determinator for determining a vertical behavior of the sprung mass of the vehicle body;

a damping force characteristic basic mode switching block for determining a direction of the determined vertical behavior of the vehicle body, for switching a present mode of operation of the shock absorber into the first mode of operation when the direction of the determined vertical behavior is upward, for switching the present mode of operation of the shock absorber into the second mode when the direction of the determined vertical behavior is downward, and for switching the present mode of operation into the third mode when the direction of the determined vertical behavior is neither upward nor downward; and a damping force characteristic special mode switching block for switching the present mode of operation of the shock absorber into the fourth mode of operation when a predetermined condition on a vehicular behavior is satisfied.

According to a still another aspect of the present invention, there is provided with a method for controlling a damping force characteristic for a vehicular shock absorber, the shock absorber being so arranged and constructed as to take a first mode of operation such as to provide a relatively high damping force characteristic for a damping force characteristic in an extension phase while providing a relatively low damping force characteristic in a compression phase, a second mode of operation such as to provide the relatively high damping force characteristic for the damping force characteristic in the compression phase while providing the relatively low damping force characteristic for the damping force characteristic in the extension phase, a third mode of operation such as to provide the relatively low damping force characteristics for the damping force characteristics in both of the extension and compression phases, and a fourth mode of operation such as to provide the relatively high damping force characteristics in both of the extension and compression phases, the method comprising the steps of determining a vertical behavior of the sprung mass of a vehicle body; determining a direction of the determined vertical behavior of the vehicle body; switching a present mode of operation of the shock absorber into the first mode of operation when the direction of the determined vertical behavior is upward; switching the present mode of operation into the second mode when the direction of the determined vertical behavior is downward; and switching the present mode of operation into the third mode when the direction of the determined vertical behavior is neither upward nor downward; determining whether a predetermined condition on a vehicular behavior is satisfied; and switching the present mode of operation of the shock absorber into the fourth mode of operation when the predetermined condition is satisfied.

BRIEF DESCRIPTION OF THE DRAWINGS

FIG. 6 are explanatory cross sectional views of a control valve cut way along lines S1—S1, S2—S2, S3—S3, and S4—S4 of FIG. 3 for explaining operations of the control valve of the damping force characteristic variable type shock absorber shown in FIG. 3.

FIGS. 11A, 11B, 11C, and 11D show integrally a timing chart for explaining the control operation by means of the normal control section as shown in FIG. 10.

FIG. 12 is an explanatory view of the revolution (pivotal) angle of the control valve, the damping force characteristic in extension and expansion phases from an H-S region ① and an H-H region ④ and open-and-closure situations of each flow passage in a modification of the damping force characteristic variable type shock absorber.

BEST MODE FOR CARRYING OUT THE INVENTION

Reference will hereinafter be made to the drawings in order to facilitate a better understanding of the present invention.

Figure 1:
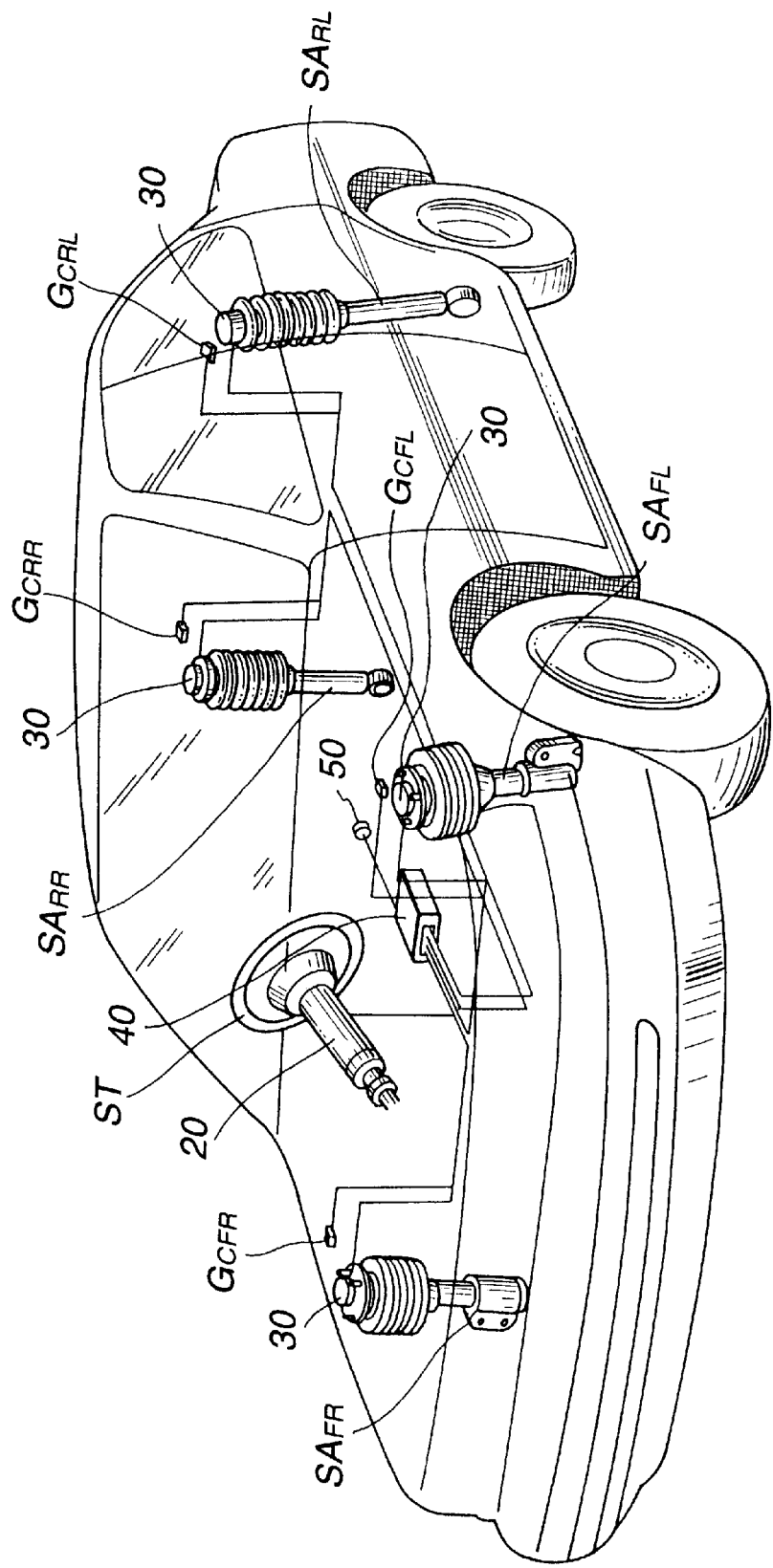
FIG. 1 is an explanatory perspective view of an automotive vehicle to which a damping force characteristic control apparatus of a preferred embodiment according to the present invention is applicable.

FIG. 1 shows an automotive vehicle to which an apparatus for controlling damping force characteristics for respective shock absorbers in a preferred embodiment according to the present invention is applicable.

Figure 2:
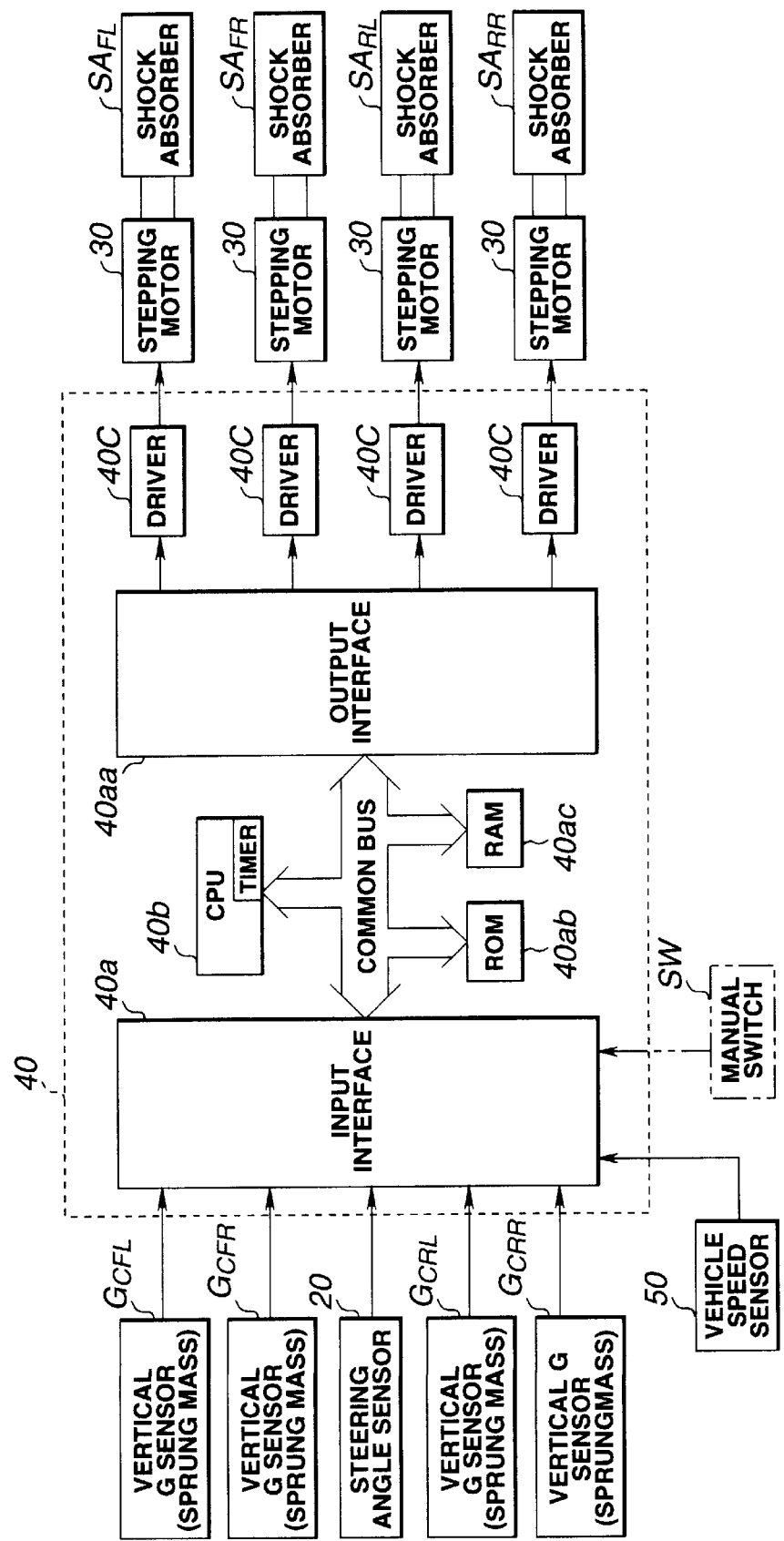
FIG. 2 is a system block diagram of the damping force characteristic control apparatus in the preferred embodiment shown in FIG. 1.

FIG. 2 shows a circuit block diagram of the damping force characteristic controlling apparatus in the preferred embodiment according to the present invention shown in FIG. 1.

Each of four shock absorbers $SA_{FR}$, $SA_{FL}$, $SA_{RL}$, and $SA_{RR}$ is interposed between a vehicle body as a sprung mass and a corresponding one of front left and front right and rear left and rear right road wheels as an unsprung mass.

It is noted that the representative one of the four shock absorbers is denoted merely by SA.

It is also noted that a subscript of FR denotes the front right road wheel, a subscript of FL denotes the front left road wheel, a subscript of RR denotes the rear right road wheel, a subscript of RL denotes the rear left road wheel.

A plurality of sprung mass vertical acceleration sensors, i.e., four vertical G sensors Gc ($G_{CFL}$, $G_{CFR}$, $G_{CRL}$, and $G_{CRR}$) are disposed on given positions of the vehicle body adjacent to the respectively corresponding front left (FL) and right (FR) and rear left (RL) and rear right (RR) road wheels to detect the sprung mass vertical accelerations at the front left and right road wheel arranged positions of the vehicle body (positive (+) when each thereof is upward with respect to a road surface on which the vehicle is running and negative (−) when it is downward with respect thereto).

A steering angle sensor 20 is disposed on a steering column of a steering system ST to detect a steering angle θ and a steering velocity θv. A vehicle speed sensor 50 is installed on the vehicle to detect a vehicle velocity Vs. A control unit 40 is installed at a part of the vehicle body adjacent to a vehicular passenger seat for receiving signals derived from each of the vertical G sensors Gc ($G_{CFL}$, $G_{CFR}$, $G_{CRL}$, and $G_{CRR}$) and for outputting drive signals for stepping motors 30 of the respective shock absorbers $SA_{FL}$, $SA_{FR}$, $SA_{RL}$, and $SA_{RR}$.

The control unit 40 includes an input interface 40a; a CPU (Central Processing Unit) 40b; a common bus, a ROM (Read Only Memory) 4ab; a RAM (Random Access Memory) 40ac; an output interface 40aa; and four drivers 40c. The drivers 40c are connected to the respectively corresponding stepping motors 3 for receiving control signals from the output interface 40aa and outputting the drive signals to pivot the corresponding stepping motors 3 according to the contents of the control signals. It is noted that the stepping motors 30 are incorporated into the corresponding shock absorbers $SA_{FL}$, $SA_{FR}$, $SA_{RL}$, and $SA_{RR}$.

The control unit 40 receives sensor signals from the vertical G sensors Gc, the steering angle sensor 20, and the vehicle speed sensor 50 and executes the damping force characteristic control for the respective shock absorbers SA ($SA_{FL}$, $SA_{FR}$, $SA_{RL}$, and $SA_{RR}$) on the basis of the sensor signals described above.

The control unit 40 is provided with a signal processing circuit (refer to FIG. 9) which derives a sprung mass vertical velocity signal VB to perform a damping force characteristic control for each shock absorber SA on the basis of the sprung mass vertical accelerations G ($G_{FL}$, $G_{FR}$, $G_{RL}$, $G_{RR}$) from the vertical G sensors GC ($GC_{FL}$, $GC_{FR}$, $GC_{RL}$, $GC_{RR}$). The details of the signal processing circuit will be described later.

Figure 3:
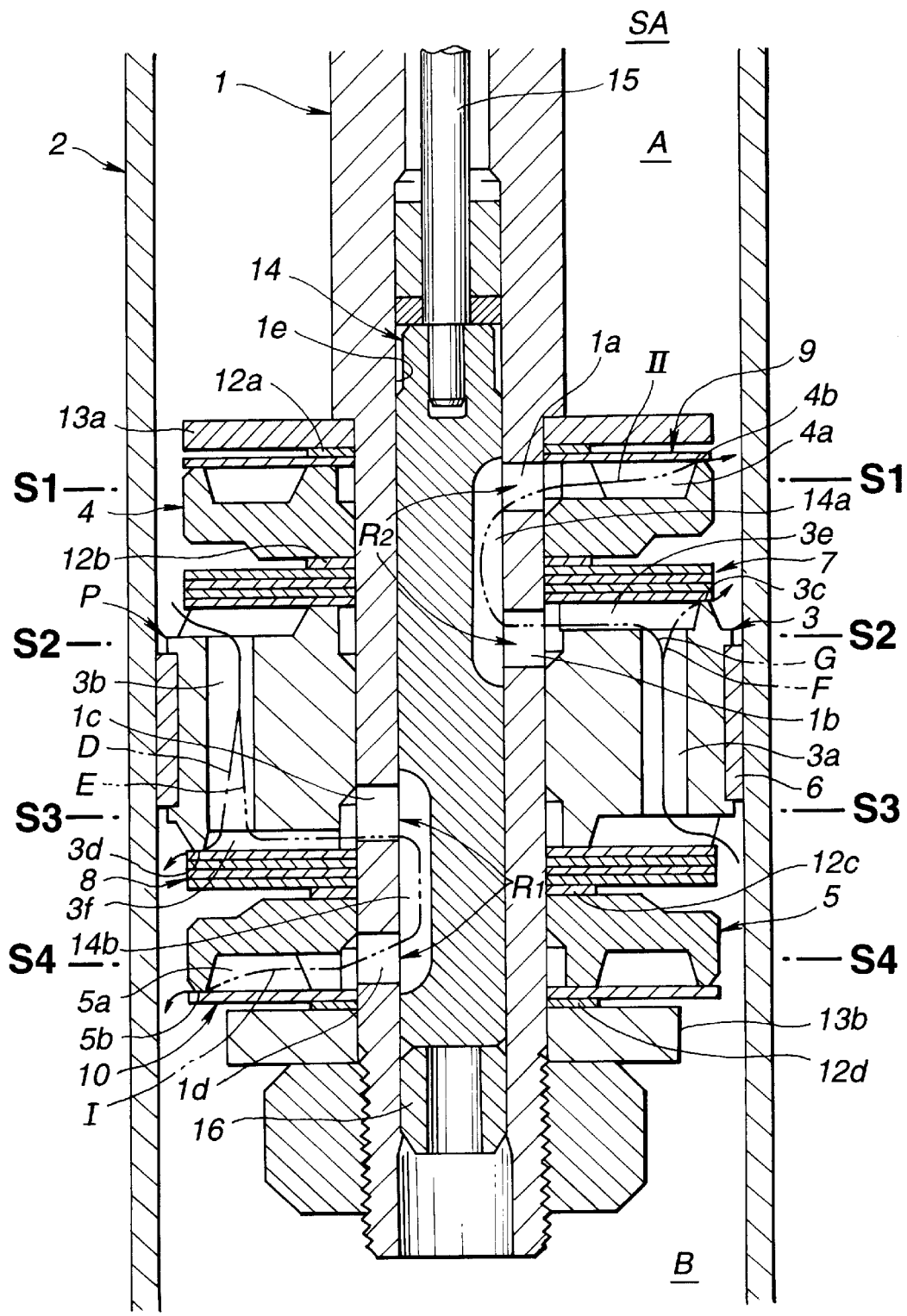
FIG. 3 is a cross sectional view of each of damping force characteristic variable type shock absorber shown in FIGS. 1 and 2.

FIG. 3 shows a cross sectional view indicating an essential structure of the shock absorber SA.

The shock absorber SA is provided with a piston P defining an inside of a cylinder 2 into an upper chamber A and a lower chamber B. The piston P is attached onto an outer periphery of a tip of a piston rod 1 (cylindrical member) and is slid within the cylinder 2. The piston P includes: a piston body 3; and compression phase sub body 4 and extension phase sub body 5 serially incorporated in upper and lower ends of the piston body 3.

A piston ring 6 is attached onto an outer peripheral surface of the piston body 3. The piston ring 6 slidably seals between the piston body 3 and the cylinder 2.

Figure 4:
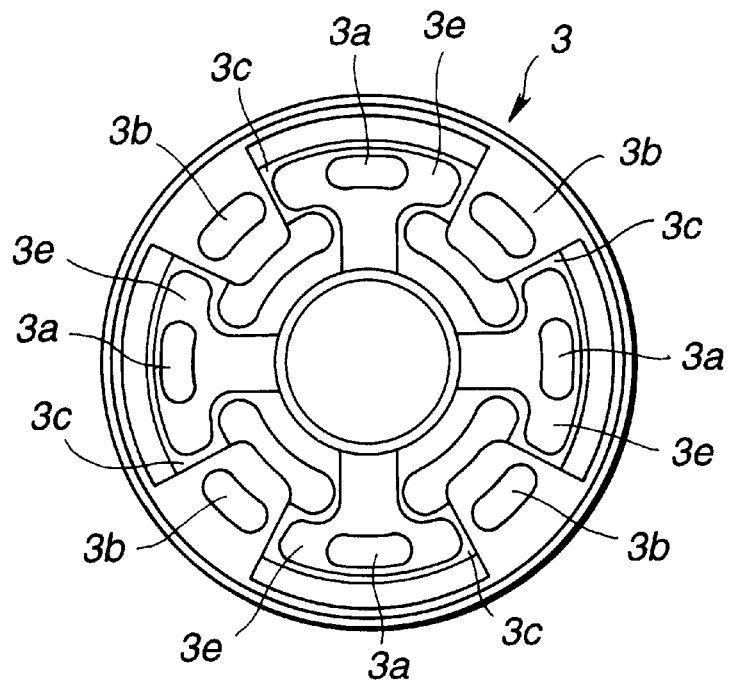
FIGS. 4 and 5 are top view and bottom view of a piston body shown in FIG. 3, respectively.
Figure 5:
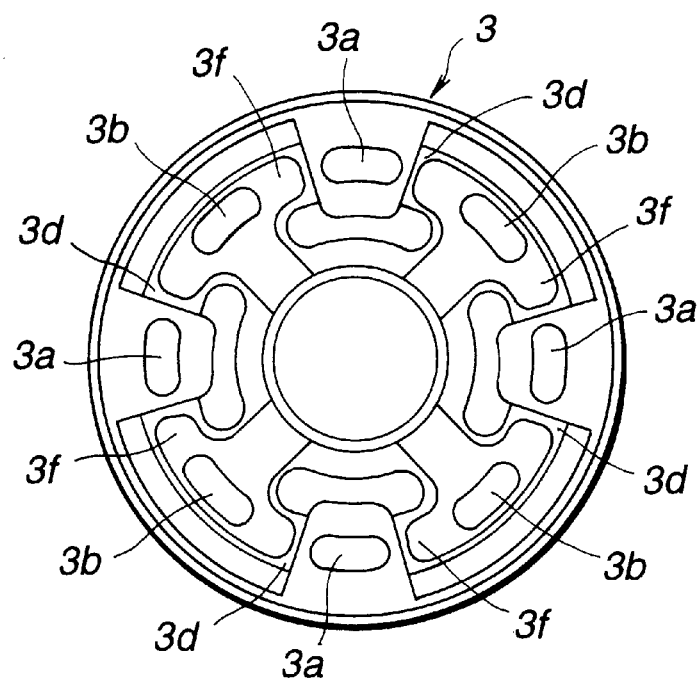

FIGS. 4 and 5 show details of the piston body 3

Four compression phase communication holes 3a to secure working fluid flows from the lower chamber B to the upper chamber A and four extension phase communication holes 3b to secure the working fluid flows from the upper chamber A to the lower chamber B are alternatingly disposed in a circumferential direction of the piston body 3.

In addition, a compression phase seat surface 3c is projected on an upper surface of the piston body 3 and is formed with a compression phase intermediate pressure receiving chamber 3e which communicates with a compression phase communication hole 3a. A compression phase seat surface 3d which forms a compression phase intermediate pressure receiving chamber 3f is projected on a lower surface of the piston body 3 which is communicated with the compression phase communication hole 3a. The compression phase intermediate pressure receiving chamber 3f is communicated with each extension phase communication hole 3b. A compression phase highly damping valve 7 is disposed on the upper surface of the piston body 3 and is contacted against the compression phase seat surface 3c so as to limitedly allow the flow of the working fluid in each compression phase communication hole 3a. An extension phase highly damping valve 8 is installed on the lower surface of the piston body 3 which limitedly allows the flow of the working fluid in each extension phase communication hole 3b and is contacted against the extension phase seat surface 3d.

A compression phase seat surface 4b which forms a compression phase pressure receiving chamber 4a is projected from an upper surface of the compression phase sub body 4. A compression phase check valve 9 is contacted against and installed on the compression phase seat surface 4b.

An extension phase seat surface 5b which forms the extension phase pressure receiving chamber 5a is projected on the lower surface of the extension phase sub body 5. An extension phase check valve 10 is contacted against and installed on the extension phase seat surface 5b.

It is noted that washers 12a, 12b, 12c, and 12d and retainers 13a and 13b are disposed on the piston rod 1 in order to suppress a flexed variable of each valve 7, 8, 9, and 10 in their opened directions by a predetermined quantity allowing the flexing of each valve to be its opened directions.

A control valve (also called, pivoter or adjuster) 14 of an approximately cylindrical shape is pivotally inserted into a hole 1e formed so as to be axially penetrated through the piston rod 1.

A pair of compression phase communication grooves 14a and 14b are axially formed on the outer periphery of the control valve 14 and are symmetrically formed with each other with respect to a radial center of the control valve 14. First and second lateral holes 1a and 1b (first port 1a and second port 1b) are formed radially on the piston rod 1.

A compression phase bypass flow passage II is formed which communicates the working fluid between the compression phase communication holes 3a and the upper chamber (compression phase lower pressure chamber) A by bypassing the compression phase highly damping valve 7. The compression phase bypass flow passage II includes the pair of first and second communication grooves 14a and 14b, the first and second parts 14a and 14b, the first and second parts 1a and 1b, and the compression phase intermediate pressure receiving chamber 3e.

An extension phase bypass flow passage I is formed which communicates the working fluid between the extension phase communication holes 3b and the lower chamber (extension phase lower pressure chamber) B by bypassing the extension phase highly damping valve 8. A pair of extension phase communication grooves 14a and 14b are axially formed on the outer periphery of the control valve 14 and are symmetrically formed with each other with respect to a radial center of the control valve 14. In addition, third lateral hole (third port) 1c and fourth lateral hole (fourth port) 1d are formed radially on the piston rod 1.

The extension phase bypass passage I includes the pair of the extension phase communication grooves 14a and 14b; the third and fourth ports 1c and 1d; and the extension phase intermediate pressure receiving chamber 3f formed on the lower end surface of the extension phase sub body 5.

A compression phase variable throttling $R_2$ is formed between the compression phase communication grooves 14a and 14b and the first lateral hole 1a and the second lateral hole 1b. An extension phase variable throttling $R_1$ is formed between the extension phase communication groove 14b, the third port 1c, and the fourth lateral hole 1d. When the control valve 14 is pivoted, an opening angle of each variable throttling $R_1$ and $R_2$ can independently be varied.

It is noted that the control valve 14 is linked to a control rod 15 extended in the hole 1e so as to receive a driving force from the corresponding one of the stepping motors 30 in FIG. 2.

Each stepping motor 30 can be driven to pivot through a given angle according to the sprung mass vertical velocity VB.

A plug 16 to prevent the control valve 14 from being drawn out from the hole 1e is fitted into the lower side position of the control valve 14.

A working fluid communicatable passage during the extension phase of the piston P includes: an extension phase main flow passage D streaming from the upper chamber A into the extension phase communicating hole 3b, opening the extension phase highly damping valve 8 at the position of the extension phase intermediate pressure receiving chamber 3f, and streaming into the lower chamber B via the opened extension phase highly damping valve 8; and an extension phase sub flow passage E bypassing the extension phase highly damping valve 8 from the extension phase communication hole 3b, passing through the extension phase bypass flow passage I, opening the compression phase highly damping valve 7 at the position of the compression phase intermediate pressure receiving chamber 3e, and streaming the opened compression phase highly damping valve 7 into the upper chamber A; and a compression phase sub flow passage G bypassing the compression phase highly damping valve 7 from the compression phase communication hole 3a, passing through the compression phase bypass flow passage II, opening the compression phase check valve 9, and streaming into the upper chamber A.

Figure 6:
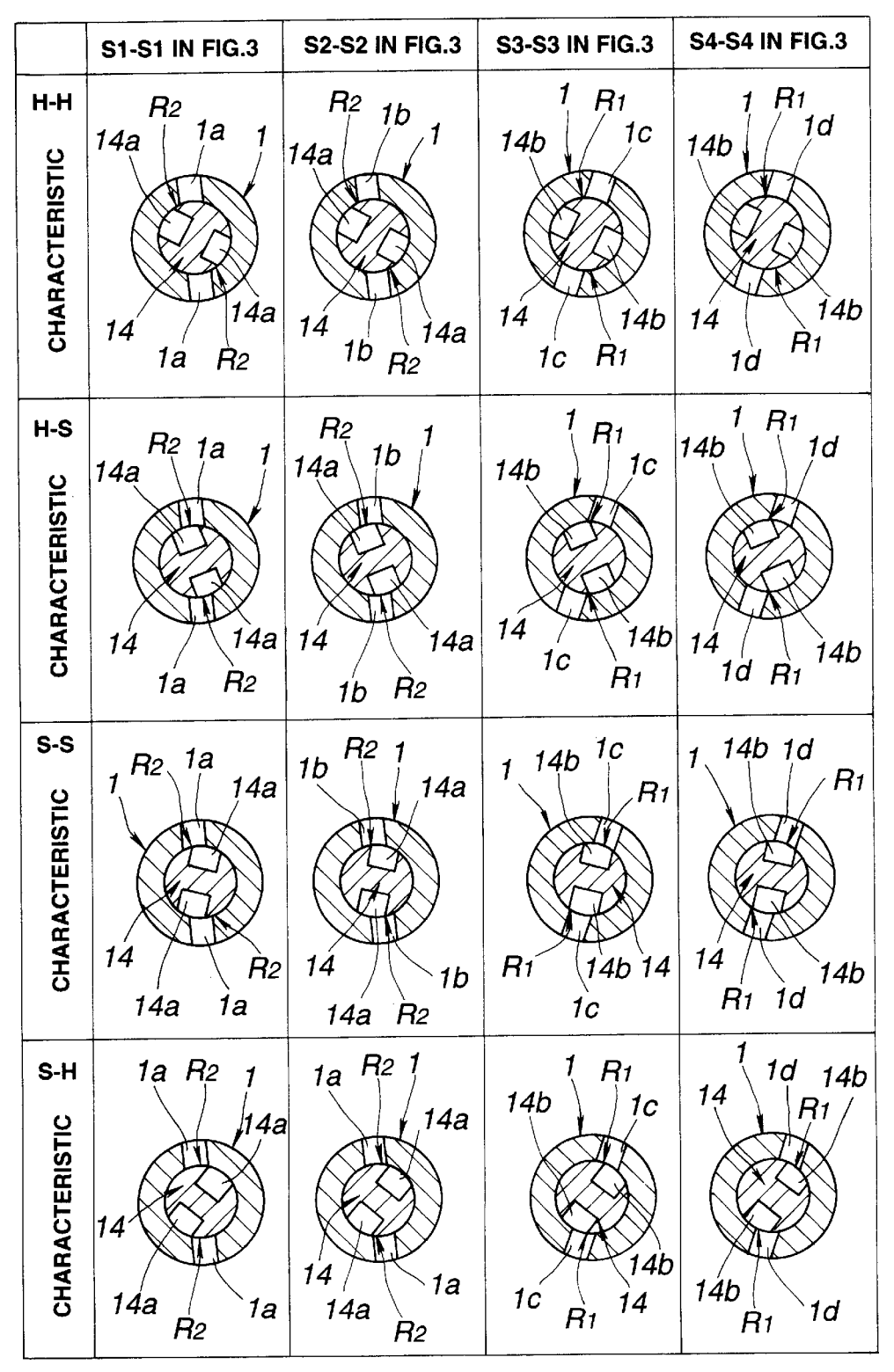

In addition, the control valve 14 can be switched into an arbitrary position in a range of four positions shown in FIG. 6 on the basis of its pivotal movement: H-S characteristic position (first mode); S-H characteristic position (second mode); S-S characteristic position (third mode); and H-H characteristic position (fourth mode).

Figure 8:
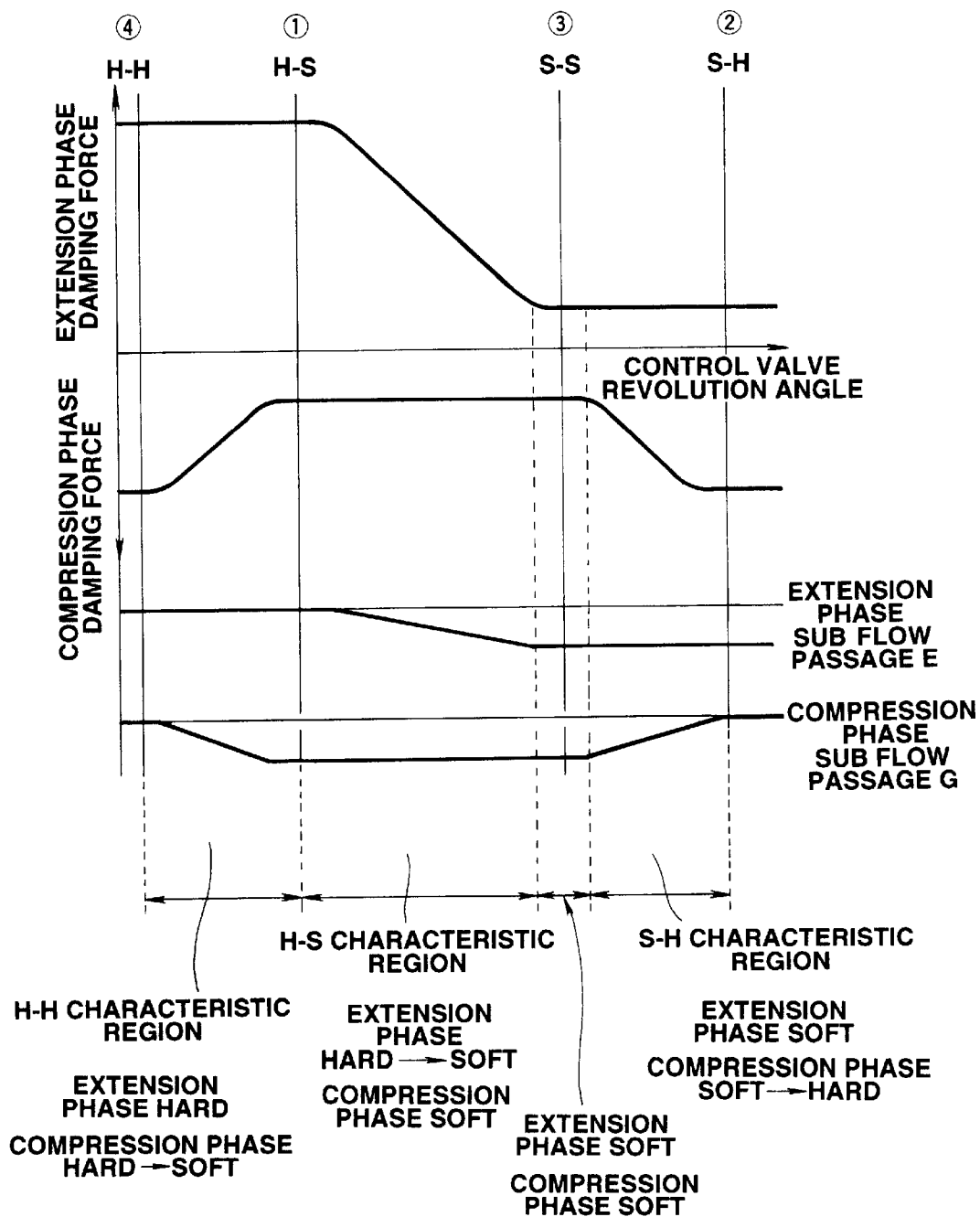
FIG. 8 is an explanatory view of a revolutional (pivotal) angle of the control valve, the damping force characteristic in extension and compression phases from H-S to H-H regions, and open-and-closure situations of each flow passage in the damping force characteristic variable type shock absorber shown in FIG. 3.

FIG. 8 shows a switching characteristic on the damping force characteristic and open and closure situation of each flow passage.

It is noted that S denotes the soft (or small) damping force characteristic and H denotes the hard (or large) damping force characteristic.

Figure 7:
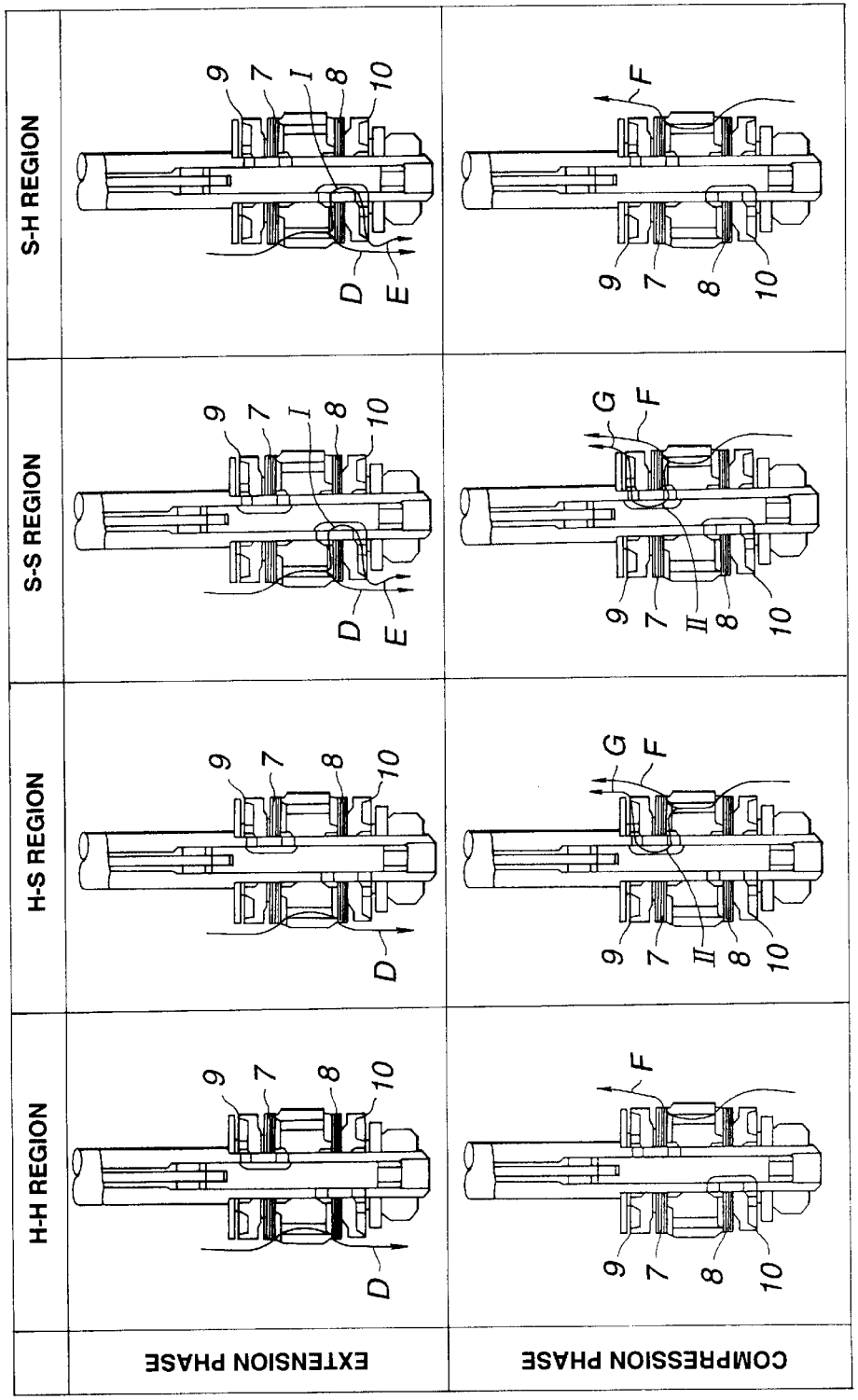
FIG. 7 is an integrally explanatory view of the damping force characteristic variable type shock absorber shown in FIG. 3 for explaining a working fluid flow in a case of an H-H characteristic position, an H-S characteristic position, an S-S characteristic position, and an S-H characteristic position.

First, in the S-S characteristic position (③ in FIG. 8), all of the extension phase variable throttling ($R_1$) and the compression phase variable throttling ($R_2$) are opened. As shown in S-S column of FIG. 7, the extension phase main flow passage D, the extension phase sub flow passage E, the compression phase main flow passage F, and the compression phase sub flow passage G are enabled to be communicated between the upper and lower chambers A and B. Hence, during the extension phase, the working fluid flows through the extension phase sub flow passage E having a small flow resistance in a low piston speed region.

As the piston speed becomes lower, the working fluid main flow passage D. Thus, the damping force characteristic during the extension phase becomes soft.

In addition, during the compression phase, the working fluid flows through the compression phase sub flow passage G having the small flow resistance in the low piston speed region. As the piston speed becomes faster, the working fluid flows through the compression phase main flow passage F. Thus, the damping force characteristic during the compression phase becomes soft (S-S characteristic).

Conversely, in the S-H characteristic position (② in FIG. 8) of FIG. 6, the extension phase variable throttling $R_1$ is opened and the compression phase variable throttling $R_2$ is closed. As shown in S-H column of FIG. 7, the working fluid can be flowed only through the compression phase main flow passage F, the extension phase main flow passage D, and the extension phase sub flow passage E. Thus, the damping force characteristic during the extension phase becomes soft but that during the compression phase becomes hard (S-H characteristic).

In addition, in the H-S characteristic position (① in FIG. 8), the compression phase variable throttling $R_2$ is opened and the extension phase variable throttling $R_1$ is closed. As shown in S-H column of FIG. 7, the working fluid can be caused to flow only through the compression phase main flow passage F, the extension phase main flow passage D, and the extension phase sub flow passage E. Thus, the damping force characteristic during the extension phase becomes soft but that during the compression phase becomes hard (S-H characteristic).

In addition, in the H-S characteristic position (① in FIG. 8), the compression phase variable throttling $R_2$ is opened and the extension phase variable throttling $R_1$ is closed. As shown in H-S column of FIG. 7, the working fluid can be caused to flow only through the extension phase main flow passage D, the compression phase main flow passage F, and the compression phase sub flow passage G. Thus, the damping force characteristic in the compression phase becomes soft but that in the extension phase becomes hard (H-S characteristic).

Furthermore, in the H-H characteristic position of FIG. 6 (④ in FIG. 8), both of the extension phase variable throttling $R_1$ and the compression phase variable throttling $R_2$ are closed. As shown in H-H column of FIG. 7, the working fluid can be caused to flow only through the compression phase main flow passage F and the extension phase main flow passage D. Thus, the damping force characteristic in both of the compression and extension phases become hard (H-H characteristic).

When the control valve 14 is pivoted in the counterclockwise direction thereof in order to shift from the S-S characteristic position of FIG. 6 to the H-S characteristic position, the throttle opening angle of the extension phase throttling $R_1$ is throttled so that a passage cross sectional area of the extension phase sub flow passage F is reduced. Hence, with the damping force characteristic during the compression phase maintained at the soft state, that in the extension phase is gradually harder (H-S characteristic region (first variable region)).

When the control valve 14 is pivoted in the clockwise direction in order to shift from the S-S characteristic position of FIG. 6 toward the S-H characteristic position, the throttle opening angle of the compression phase variable throttling $R_2$ is throttled so that the passage cross sectional area of the compression phase sub flow passage G is reduced. Hence, with the extension phase maintained at the soft state, the damping force characteristic in the compression phase becomes gradually harder (S-H characteristic region (second variable region)).

Furthermore, when the control valve 14 is pivoted in the counterclockwise direction in order to shift from the H-S characteristic position of FIG. 6 toward the H-H characteristic position, the throttle opening angle of the compression phase variable throttling $R_2$ is throttled so that the passage cross sectional area of the compression phase sub flow passage G is reduced. Thus, with the damping force characteristic in the extension phase maintained at the hard state, that in the compression phase becomes gradually harder (H-H characteristic region (third variable region)).

Next, the structure of the signal processing circuit to derive the sprung mass vertical velocity VB used to perform the damping force characteristic control over each shock absorber SA through the control unit 40 will be described below with reference to FIG. 9.

Figure 9:
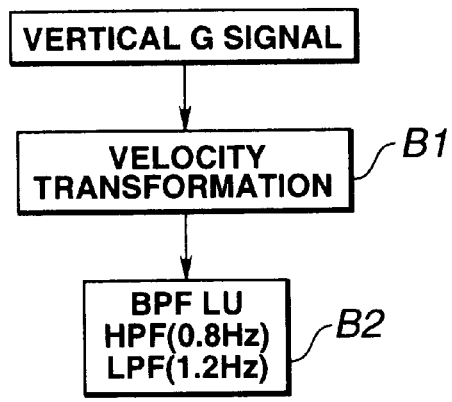
FIG. 9 is an explanatory block diagram of a signal processing circuit to derive a sprung mass vertical velocity signal (VB) in a control unit shown in FIGS. 1 and 2.

At a step B1 of FIG. 9, the CPU 40a of the control unit 40 converts the respective sprung mass vertical velocities G ($G_{FL}$, $G_{FR}$, $G_{RL}$, $G_{RR}$) detected by means of the corresponding vertical G sensors Gc (GcFL, GcFR, GcRL, GcRR) into corresponding sprung mass vertical velocities at the respective road wheel arranged postions of the vehicle body through an integration processing.

At a step B2 of FIG. 9, the converted sprung mass vertical velocities are filtered through band pass filters (BPFs) in order to eliminate frequency components other than a target frequency band to be controlled. In details, each of the same band pass filters (BPF) is constituted by a high pass filter (HPF) (its cut-off frequency is 0.8 Hz) and a low pass filter (LPF) (its cut-off frequency is 1.2 Hz). With a sprung mass resonance frequency band of the vehicle as a target, the CPU 40a derives sprung mass vertical velocity signals VB ($VB_{FL}$, $VB_{FR}$, $VB_{RL}$, $VB_{RR}$) as bounce signals (vehicular vertical behaviors).

Next, the control unit 40 executes the damping force characteristic control operation for each shock absorber SA.

Figure 10:
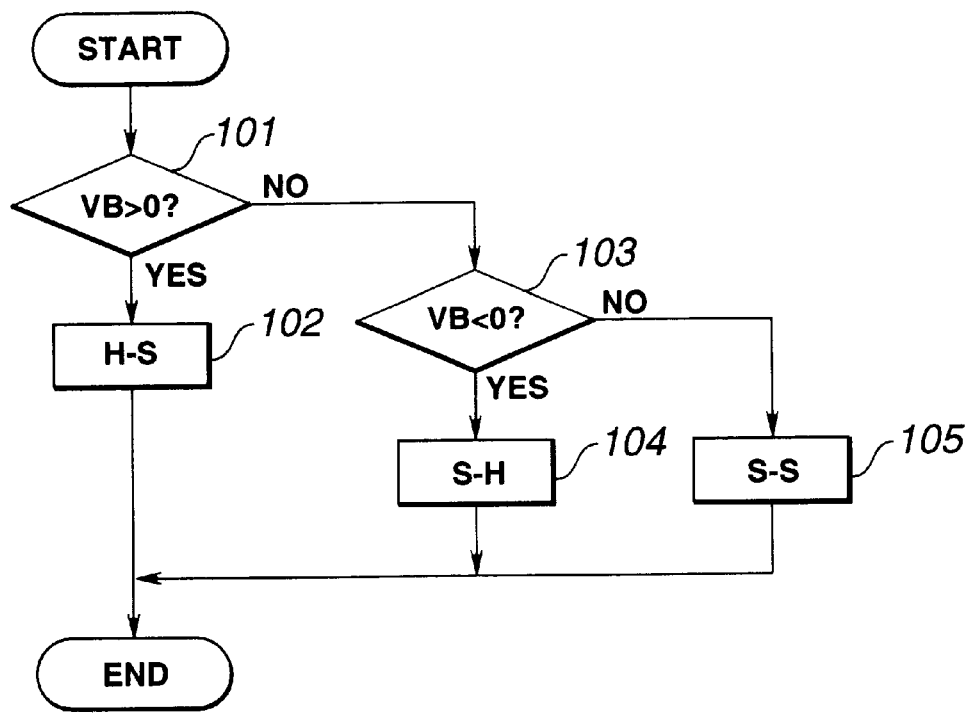
FIG. 10 is an operational flowchart for explaining a control of a normal control operation by means of a normal control section (a damping force characteristic basic mode switching block) in the control unit shown in FIGS. 1 and 2.

FIG. 10 shows an operational flowchart indicating the contents of a normal control by means of a basic control portion (damping force characteristic basic mode switching block). Such a normal control as shown in FIG. 10 is carried out for each shock absorber SA ($SA_{FL}$, $SA_{FR}$, $SA_{RL}$, and $SA_{RR}$).

At a step 101 of FIG. 10, the CPU 40b determines whether a representative one of the derived sprung mass vertical velocity signals indicate plus. If YES (plus) at the step 101, the routine goes to a step 102 in which the corresponding one of the shock absorbers SA is controlled to provide H-S characteristic position. If NO (zero or minus) at the step 101, the routine goes to a step 102. At the step 102, the CPU 40b determines whether the representative one of the derived sprung mass vertical velocity signals is negative (minus). If YES at the step 102 (minus), the routine goes to a step 104. At the step 104, the CPU 40b controls the corresponding shock absorber SA to provide S-H characteristic position. If NO at the step 103, the routine goes to a step 105.

At the step 105 in which the value of the representative one of the derived sprung mass vertical velocity signals VB is determined to be zero and the corresponding one of the shock absorbers SA is controlled to provide S-S characteristic position.

Next, FIGS. 11A, 11B, 11C, and 11D show integrally a timing chart of each signal during the basic damping force control operation described with reference to FIG. 10.

Suppose that one of the sprung mass vertical velocity signals VB is varied with time as shown in FIG. 11A. When the sprung mass vertical velocity signal VB indicates zero, the corresponding shock absorber SA is controlled to provide the S-S characteristic position. In addition, when the value of the corresponding sprung mass vertical velocity VB is positive (plus), the corresponding shock absorber SA is controlled to provide the H-S characteristic position. Within the H-S characteristic region, the damping force characteristic in the compression region, the damping force characteristic in the compression phase is fixed to the soft characteristic and, on the other hand, the damping force characteristic in the extension phase (the target damping force characteristic position PT) is varied in proportion to the sprung mass vertical velocity VB on the basis of the following equation (1).

$$P_T = \beta T \, VB \tag{1}$$

It is noted that $\beta T$ denotes a constant at the extension phase of each corresponding shock absorber SA.

In addition, if the value of the corresponding sprung mass vertical velocity signal VB is negative (minus), the corresponding shock absorber SA is controlled to provide the S-H characteristic region, the damping force characteristic at the extension phase is fixed to the soft characteristic and, on the other hand, the damping force characteristic at the extension phase (the target damping force characteristic position Pc) is varied in proportion to the sprung mass vertical velocity signal VB on the basis of the following equation (2).

$$P_c = \beta C \, VB \tag{2}$$

It is noted that $\beta C$ denotes the compression phase constant of each corresponding shock absorber.

Next, shifting operation states of the control region of the representative shock absorber SA mainly from the damping force characteristic control operation of the control unit 40 will be described with reference to FIGS. 11A through 11D.

In the integral timing chart of FIGS. 11A through 11D, a region a indicates a state in which the value of the corresponding sprung mass vertical velocity VB is reversed from a negative value (downward direction) to a positive value (upward direction). At this time since the relative velocity between the sprung mass and the unsprung mass still indicates the negative value (one of the phases in which the corresponding shock absorber SA is entered is the compression phase), the corresponding shock absorber SA is controlled to provide the H-S characteristic region on the basis of the above-described sprung mass vertical velocity VB). Hence, within the region a, the compression phase of the corresponding shock absorber SA indicates the soft characteristic.

A region b indicates a region in which the relative velocity between the sprung mass and the unsprung mass is switched from the negative value to the positive value (one of the phases in which the corresponding shock absorber SA is entered is the extension phase), the corresponding sprung mass vertical velocity VB still indicating the positive value (upward direction). At this time, since the corresponding shock absorber SA is controlled to provide H-S characteristic region on the basis of the direction of the corresponding sprung mass vertical velocity VB and one of the phases in which the corresponding shock absorber SA is entered is the extension phase. Within this region b, the extension phase in which the corresponding shock absorber SA is entered indicates the hard characteristic in proportion to the value of the corresponding sprung mass vertical velocity VB.

A region c indicates a state in which the corresponding sprung mass vertical velocity VB is reversed from the positive value (upward direction) to the negative value (downward direction) but the relative velocity still indicates the positive value (one of the phases in which the corresponding shock absorber SA is entered is the compression phase). At this time, the corresponding shock absorber SA is controlled to provide the S-H characteristic region on the basis of the direction of the corresponding sprung mass vertical velocity VB. Hence, within this region of c, the extension phase in which the corresponding shock absorber SA is entered indicates the soft characteristic.

A region d indicates a state in which the corresponding sprung mass vertical velocity VB still indicates the negative value (downward direction) but the relative velocity between the sprung mass and the unsprung mass is reversed from the positive value to the negative value (one of the phases in which the corresponding shock absorber SA is entered is the compression phase). Hence, within this region of d, the compression phase in which the corresponding shock absorber SA is entered indicates the hard characteristic in proportion to the value of the corresponding sprung mass vertical velocity VB.

In this embodiment, as described above, in a case when the corresponding sprung mass vertical velocity VB indicates the same sign as the relative velocity (region b and region d), one of the phases in which the corresponding shock absorber SA is entered at the time in which the above-described case occurs is controlled to indicate the hard characteristic.

In a case when the corresponding sprung mass vertical velocity VB indicates a different sign from that of the relative velocity (region a and region c), one of the phases in which the corresponding shock absorber SA is entered is controlled to indicate the soft characteristic. In the way described above, each shock absorber SA is controlled in the same manner as the damping force characteristic control based on a Skyhook principle.

Furthermore, in the embodiment, as described above, at a time when one of the phases in which the corresponding shock absorber SA is entered is switched, namely, when the region is transferred from the region of a to the region of c or is transferred from the region of c to the region of d (from the soft characteristic to the hard characteristic), the damping force characteristic position at one of the phases to which the switching of the control is transferred has already been switched to the hard characteristic side at the previous region a or c so that the switching from the soft characteristic to the hard characteristic can be carried out without time delay.

Next, the contents of a switching control between the normal damping force control by means of the basic control portion of the control unit 40 and a corrective control by means of a corrective control portion of the control unit 40 (a damping force characteristic special mode switching block) and its corrective control will be described below.

First, when the steering angle signal indicating the steering angular displacement θ is received from the steering angle sensor 20 and the control unit 40 determines that a steering operation such that a series of steering directional shift operations occurs to steer the vehicle equal to or exceeding a predetermined steering angular displacement θ f so as to give such a slalom-like motion to the vehicle, the switching of control from the normal damping force characteristic control by means of the normal control portion of the control unit 40 to the corrective control by means of the corrective control portion of the control unit 40 is carried out.

In details, in the corrective control, the damping force characteristic of each shock absorber SA is controlled to be switched into the H-H characteristic position at which the damping force characteristics at both of the extension and compression phases indicate hard characteristics. Thus, a transient rolling behavior of the vehicle body developed due to the steering directional shifts of the series of the steering operations can be suppressed at an initial stage of the steering directional shift.

When the control unit 40 determines that the subsequent directional shift toward a neutral position of the steering wheel of the steering system ST occurs within a predetermined period of time after the first steering directional shift toward a steering limit position has occurred, the control unit 40 determines that there is a high possibility of a traffic lane change or a slalom maneuver occurs. Hence, while the subsequent predetermined delay time is passed, the state in which a switched state to the fourth mode (H-H characteristic position) is maintained. Thereafter, the switched state to the fourth mode is released.

Consequently, the transient rolling behavior during the slalom maneuver or during the traffic lane change can be suppressed without lag of control.

On the other hand, when the subsequent steering directional shift operation toward the neutral position or reversed limit position of the steering wheel of the steering system ST does not occur within the predetermined period of time after the first steering directional shift operation toward the steering limit position has occurred, the control unit 40 determines that there is no possibility of the occurrence in the slalom maneuver. At this time, the switched state to the fourth mode is released to return the corrective control to the normal damping force characteristic control state. Consequently, the vehicular comfort can be assured.

In addition, when the control unit 40 determines that the vehicle speed Vs detected by means of the vehicle speed sensor 50 is equal to or higher than a predetermined high speed value Vf, the control unit 40 switches the control over the damping force characteristic from the normal damping force characteristic by means of the normal damping force characteristic control to the corrective control by means of the corrective control portion (H-H characteristic position). Hence, during the vehicular high speed run, the steering stability can automatically be secured.

As described above, in the embodiment of the vehicular damping force characteristic control apparatus, the transient rolling behavior developed when the slalom maneuver or the traffic lane change occurs can be suppressed at its initial stage without delay in the response of control.

In addition, the steering stability during the high speed run of the vehicle can be assured.

FIG. 12 shows the damping force characteristic switching characteristic and open-and-closure states of respective flow passages in a modification of each of the damping force characteristic variable type shock absorbers SA.

As shown in FIG. 12, the H-H characteristic region ④ is provided at a region subsequent to the S-H characteristic region ② although ④ is provided at a region subsequent to the H-S characteristic region ① in the case of FIG. 8. In the H-H characteristic region of FIG. 12, the damping force characteristic in the extension phase becomes gradually harder with that in the compression phase maintained at the hard characteristic.

Figure 14:
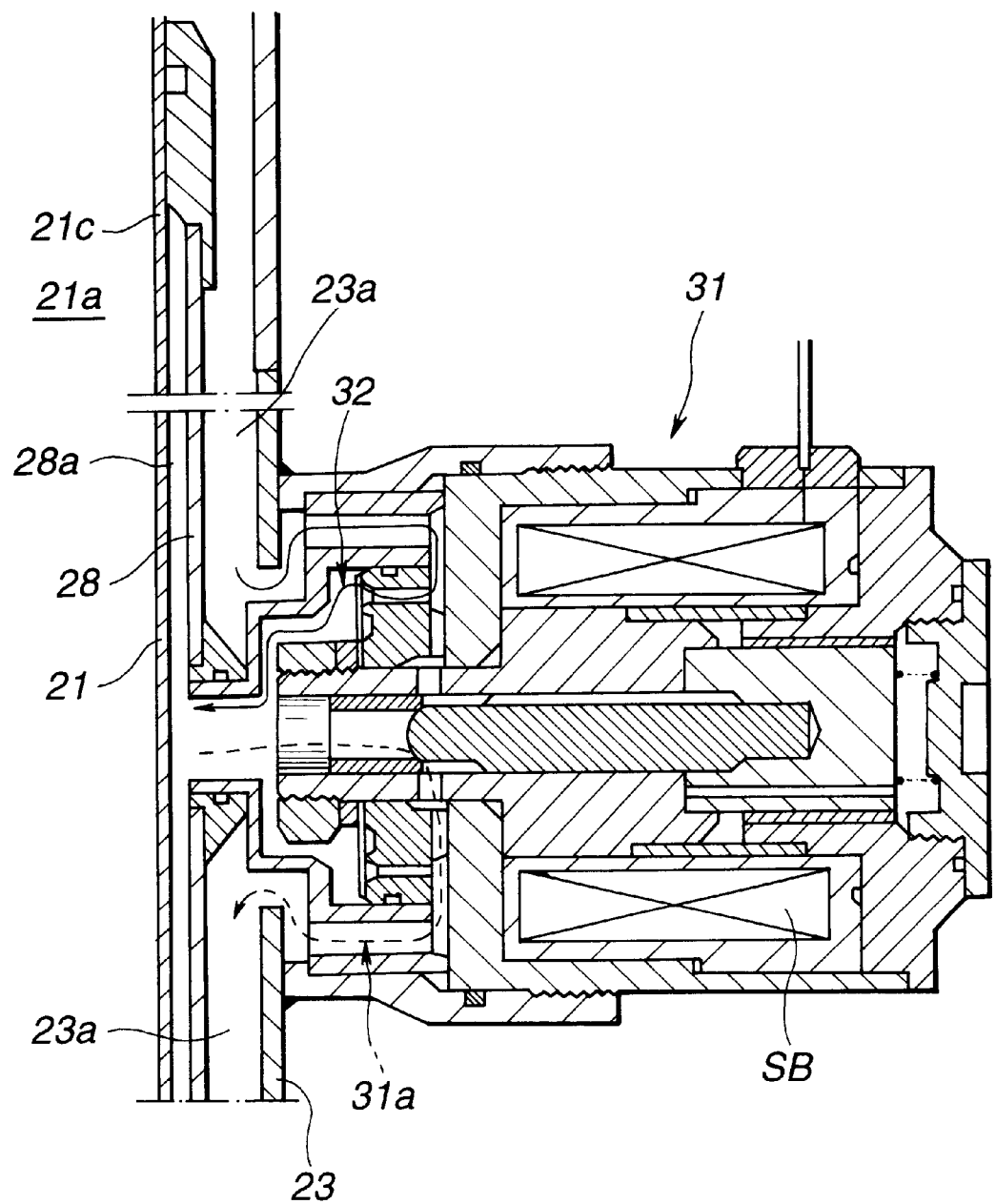
FIG. 14 is an enlarged cross sectional view of variable throttling mechanisms in the case of the other modifications of the damping force characteristic variable type shock absorber shown in FIG. 13.
Figure 15:
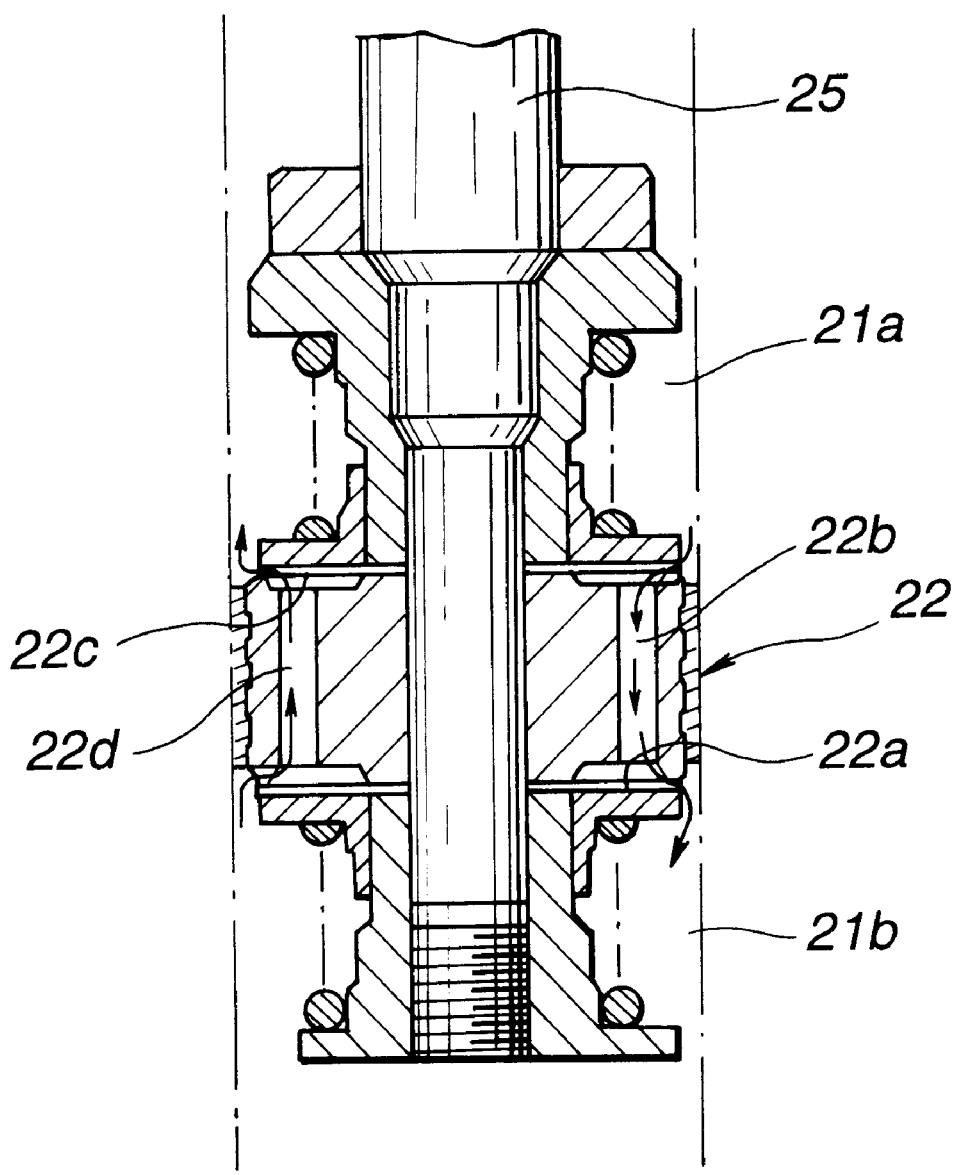
FIG. 15 is an enlarged cross sectional view of a piston in the case of the other modification of the damping force characteristic type shock absorber shown in FIGS. 13 and 14.

FIGS. 14, 15, and 16 show another modification of the damping force characteristic variable type shock absorber applicable to the apparatus for controlling the damping force characteristic of the vehicular shock absorber in the preferred embodiment.

Figure 13:
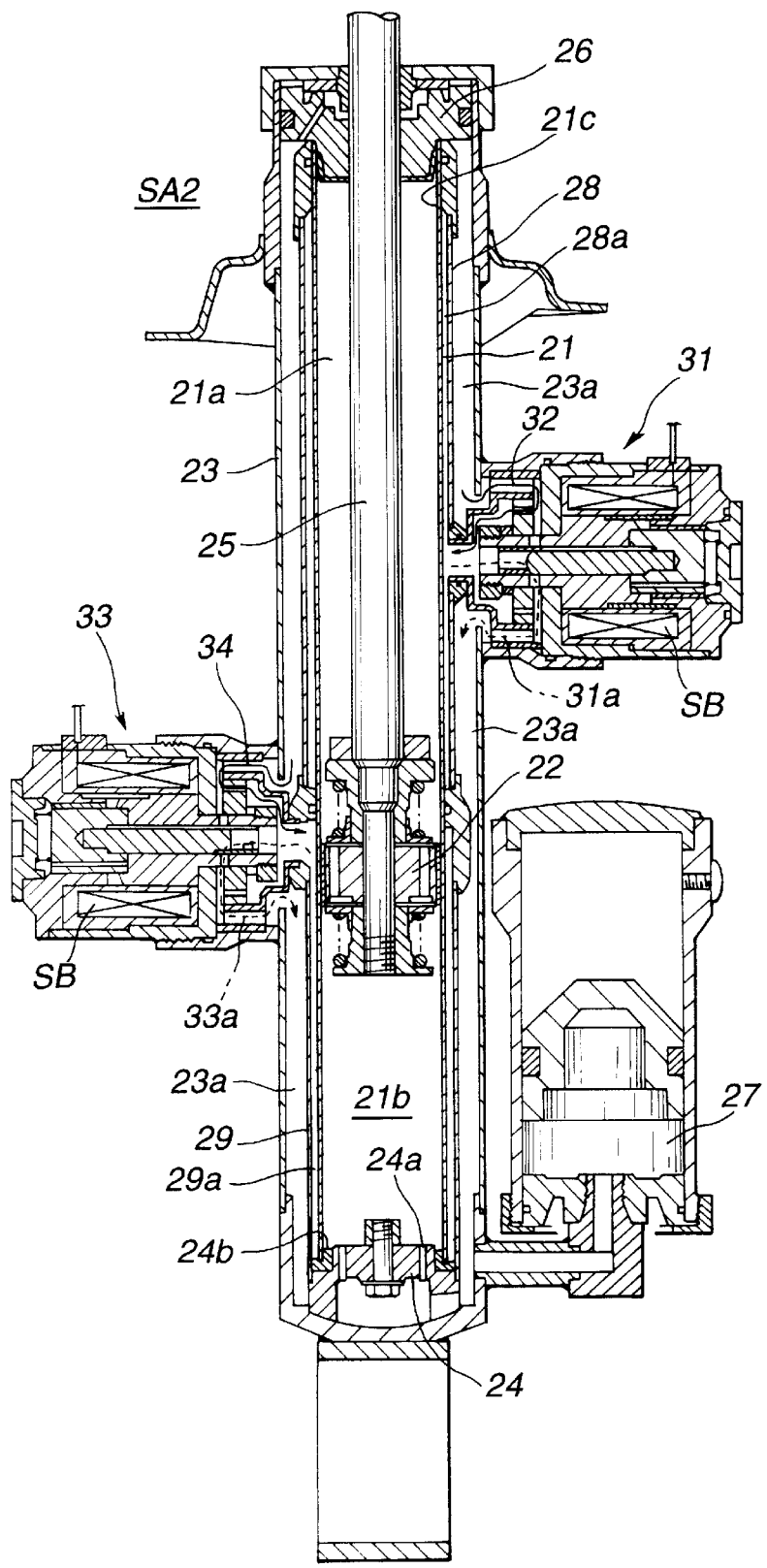
FIG. 13 is a cross sectional view of another modification of the damping force characteristic variable type shock absorber.

Especially, FIG. 13 is a cross sectional view of the other modification of the damping force characteristic variable type shock absorber SA2.

FIG. 14 is an enlarged cross sectional view of an extension phase variable throttling mechanism as will be described later.

FIG. 15 is an enlarged cross sectional view of a piston assembly as will be described later.

In the other modification of each shock absorber SA2, as shown in FIG. 13, the piston 22 is slidably installed with the cylinder 21 so as to partition the cylinder 21 into the upper chamber 21a and the lower chamber 21b.

In addition, an outer envelope 23 forms a reservoir chamber 23a on an outer periphery of the cylinder 21. A base 24 serves to partition the lower chamber 21b and the reservoir chamber 23a at the lower end portion of the cylinder 21. A check flow passage 24a which allows the working fluid to be caused to flow only in a direction from the reservoir chamber 23a to the lower chamber 21b is installed on the base 24.

The piston 22 is fixed on a lower end of the piston rod 25. A guide member 26 serves to guide the slidable movement of the piston rod 25. In addition, the guide member 26 partitions the upper chamber 21a and the reservoir chamber 23a at the upper end portion of the cylinder 21.

An accumulator 27 is communicated with the reservoir chamber 23a. An upper communicating envelope 28 is interposed between the cylinder 21 and the outer envelope 23. The upper communicating envelope 28 forms an upper annular flow passage 28a which communicates with the upper outer peripheral surface of the cylinder 21 via the upper chamber 21a and the communication hole 21c. A lower communication envelope 29 is interposed between the cylinder 21 and outer envelope 23. The lower communication envelope 29 forms a lower annular flow passage 29a which communicates the working fluid with the lower chamber 21b via the communication groove 24b is formed between the lower outer peripheral surface of the cylinder 21. As shown in FIG. 14, an extension phase variable throttling mechanism 31 forms an extension phase communication flow passage 31a which communicates the working fluid between the upper annular flow passage 28a and the reservoir chamber 23a.

The extension phase variable throttling mechanism 31 variably controls the working fluid flow quantity of the extension phase communication flow passage 31a. As shown in FIG. 14, a check flow passage 32 which bypasses the extension phase variable throttling mechanism 31 and which allows the working fluid to be caused to flow only from the reservoir chamber 23a toward the upper annular flow passage 28a.

A compression phase variable throttling mechanism 33 which forms a compression phase communication flow passage 33a which communicates the working fluid between the lower annular groove 29a and the reservoir chamber 23a.

The compression phase variable throttling mechanism 33 variably controls the working fluid flow quantity in the compression phase communication flow passage 33a.

A check flow passage 34 bypasses the communication phase variable throttling mechanism 33 and allows the working fluid to be caused to flow from the reservoir chamber 23a toward the lower annular flow passage 29a.

The piston 22, as shown in FIG. 15, is provided with: an extension phase communication hole 22b which limitedly allows the working fluid to be caused to flow only from the upper chamber 21a toward the lower chamber 21b through an extension phase disc valve (extension phase highly damping valve) 22a; and a compression phase communication hole 22d which limitedly allows the working fluid only from the lower chamber 21b toward the upper chamber 21a to generate the highly damping force through a compression phase disc valve (compression phase highly damping valve) 22c.

The extension phase variable throttling mechanism 31, as shown in FIG. 14, is constituted by a single unit in which the check flow passage 32, the extension phase communication flow passage 31a, and the check flow passage 32 are integrally incorporated into a normally closed solenoid valve SB.

The flow passage cross sectional area of the extension phase communication flow passage 31a is variably controlled to the throttle opening angle in accordance with the drive signal to the solenoid valve SB.

It is noted that since the compression phase variable throttling mechanism 33 has the same structure as the extension phase variable throttling mechanism 31, the detailed explanation of the same reference numerals as those in the extension phase variable throttling mechanism 31 will be omitted herein.

In the damping force characteristic variable type shock absorber SA2 of the other modification, the structure thereof has been described above.

The working fluid communicable passages during the extension phase are two flow passages: 1) the extension phase main flow passage (refer to FIG. 15) starting from the upper chamber 21a, streaming into the extension phase communication hole 22b and the valve-opened extension phase disc valve 22a, and ending at the lower chamber 21b; and 2) the extension phase bypass flow passage starting from the upper chamber 21a, streaming into the communication hole 21c, the upper annular flow passage 28a, the extension phase communication flow passage 31a, and the reservoir chamber 23a, and the check flow passage 24a, and ending at the lower chamber 21b.

On the other hand, the working fluid communicable passages during the compression phase are two flow passages: 1) the compression phase main flow passage (refer to FIG. 15) starting from the lower chamber 21b, streaming into the compression phase communication hole 22d and the valve-opened compression phase disc valve 22c, and ending at the upper chamber 21a; and 2) the compression phase bypass flow passage starting from the lower chamber 21b, streaming into the communication groove 24b, the lower annular flow passage 29a, the compression phase communication flow passage 33a, the reservoir chamber 23a, the check flow passage 34, the upper annular flow passage 28a, and the communication hole 21c and ending at the upper chamber 21a.

In addition, the flow passage cross sectional area of the extension phase bypass flow passage can variably be controlled to provide an arbitrary flow passage cross sectional area by a variable control over the drive signal supplied to the solenoid valve SB of the extension phase variable throttling mechanism 31. The flow passage cross sectional area of the compression phase bypass flow passage can variably be controlled to provide an arbitrary flow passage cross sectional area by the variable control over the drive signal supplied to the solenoid valve SB of the compression phase variable throttling mechanism 33.

Hence, the damping force characteristic in the extension phase provides the hard characteristic when the extension phase bypass flow passage is closed and provides the soft characteristic when the extension phase bypass flow passage is opened. Furthermore, when the throttle opening angle of the extension phase bypass flow passage is variably controlled, the damping force characteristic in the extension phase can variably be controlled to provide an arbitrary characteristic between the maximum soft and hard characteristics.

On the other hand, the damping force characteristic in the compression phase provides the hard characteristic when the compression phase bypass flow passage is closed and provides the soft characteristic when the compression phase bypass flow passage is opened. Furthermore, when the throttle opening angle of the compression phase bypass flow passage is variably controlled, the damping force characteristic in the compression phase can variably be controlled to provide an arbitrary characteristic between the maximum soft and hard characteristics As described above, when the extension phase variable throttling mechanism 31 and the compression phase variable throttling mechanism 33 are variably controlled mutually independently of each other, the damping force characteristic in each of the compression and extension phases can variably be controlled to provide an arbitrary combination of the first through fourth modes.

Since each shock absorber SA or SA2 can variably be controlled mutually independently of each other, a control responsive characteristic of switching the damping force characteristic modes can be improved.

It is noted that although the vehicular vertical behaviors are determined on the basis of the vertical acceleration signals from the respective G sensors $GC_{FL}$, $GC_{FR}$, $GC_{RL}$, and $Gc_{RR}$, the vehicular vertical behaviors may be determined by extracting the sprung mass resonance frequency band components from detected values of road wheel sensors. This is exemplified by a U.S. Pat. No. 5,638,275. (The disclosure of the above-identified United States Patent is herein incorporated by reference.)

It is also noted that a manual switch SW may be connected to the control unit 40 for forcefully switching the respective shock absorbers SA into the fourth modes via the control unit 40 when it is turned on. It is also noted that a timer is provided in the CPU 40b of the control unit 40 for measuring the predetermined period of time and the predetermined delay time and the vehicle speed sensor 50 may be incorporated into a speedometer of an instrument panel of the vehicle. It is also noted that the solenoid valves SB for the respective extension and compression phase variable throttling mechanisms 31 and 33 in the other modification of the shock absorbers SA2 are connected to the output interface 40aa of the control unit 40 shown in FIG. 2.

What is claimed is:

1. A method for controlling a damping force characteristic for a vehicular shock absorber, the shock absorber being so arranged and constructed as to take a first mode of operation such as to provide a relatively high damping force characteristic for a damping force characteristic in an extension phase while providing a relatively low damping force characteristic in a compression phase, a second mode of operation such as to provide the relatively high damping force characteristic for the damping force characteristic in the compression phase while providing the relatively low damping force characteristic for the damping force characteristic in the extension phase, a third mode of operation such as to provide the relatively low damping force characteristics for the damping force characteristics in both of the extension and compression phases, and a fourth mode of operation such as to provide the relatively high damping force characteristics in both of the extension and compression phases, the method comprising the steps of determining a vertical behavior of the sprung mass of a vehicle body; determining a direction of the determined vertical behavior of the vehicle body; switching a present mode of operation of the shock absorber into the first mode of operation when the direction of the determined vertical behavior is upward; switching the present mode of operation into the second mode when the direction of the determined vertical behavior is downward; and switching the present mode of operation into the third mode when the direction of the determined vertical behavior is neither upward nor downward; determining whether a predetermined condition on a vehicular behavior is satisfied; and switching the present mode of operation of the shock absorber into the fourth mode of operation when the predetermined condition is satisfied.

2. An apparatus for an automotive vehicle, comprising: a plurality of at least one shock absorber, each shock absorber being intervened between a sprung mass of a vehicle body and a corresponding one of front left and right road wheels and rear left and right road wheels of the vehicle and so arranged and constructed as to take a first mode of operation such as to provide a relatively high damping force characteristic for a damping force characteristic in an extension phase thereof while providing a relatively low damping force characteristic in a compression phase thereof, a second mode of operation such as to provide the relatively high damping force characteristic for the damping force characteristic in the compression phase while providing the relatively low damping force characteristic for the damping force characteristic in the extension phase, a third mode of operation such as to provide the relatively low damping force characteristics for the damping force characteristics in both of the extension and compression phases, and a fourth mode of operation such as to provide the relatively high damping force characteristics in both of the extension and compression phases;

a vehicular vertical behavior determinator for determining a vertical behavior of the sprung mass of the vehicle body;

a damping force characteristic basic mode switching block for determining a direction of the determined vertical behavior of the vehicle body, for switching a present mode of operation of the shock absorber into the first mode of operation when the direction of the determined vertical behavior is upward, for switching the present mode of operation of the shock absorber into the second mode when the direction of the determined vertical behavior is downward, and for switching the present mode of operation into the third mode when the direction of the determined vertical behavior is neither upward nor downward; and a damping force characteristic special mode switching block for switching the present mode of operation of the shock absorber into the fourth mode of operation when a predetermined condition on a vehicular behavior is satisfied.

3. An apparatus for an automotive vehicle, comprising:

at least one shock absorber intervened between a sprung mass of a vehicle body and an unsprung mass of a corresponding road wheel and so arranged and constructed as to take a first mode of operation such as to provide a relatively high damping force characteristic for a damping force characteristic in an extension phase thereof while providing a relatively low damping force characteristic in a compression phase thereof, a second mode of operation such as to provide the relatively high damping force characteristic for the damping force characteristic in the compression phase while providing the relatively low damping force characteristic for the damping force characteristic in the extension phase, a third mode of operation such as to provide the relatively low damping force characteristics for the damping force characteristics in both of the extension and compression phases, and a fourth mode of operation such as to provide the relatively high damping force characteristics in both of the extension and compression phases;

a vehicular vertical behavior determinator for determining a vertical behavior of the sprung mass of the vehicle body;

a damping force characteristic basic mode switching block for determining a direction of the determined vertical behavior of the vehicle body, for switching a present mode of operation of the shock absorber into the first mode of operation when the direction of the determined vertical behavior is upward, for switching the present mode of operation of the shock absorber into the second mode when the direction of the determined vertical behavior is downward, and for switching the present mode of operation into the third mode when the direction of the determined vertical behavior is neither upward nor downward; and a damping force characteristic special mode switching block for switching the present mode of operation of the shock absorber into the fourth mode of operation when a predetermined condition of a vehicular behavior is satisfied.

4. An apparatus for an automotive vehicle as claimed in claim 3, wherein the damping force characteristic special mode switching block includes a manual switch capable of manually switching the present mode of operation of the shock absorber into the fourth mode when the predetermined condition is satisfied.

5. An apparatus for an automotive vehicle as claimed in claim 3, which further comprises a vehicular lateral direction behavior determinator for determining a lateral direction behavior of the vehicle body and wherein the predetermined condition on the vehicular behavior is such that a shift of the lateral directional behavior of the vehicle body toward the lateral direction of the vehicle body and a return of the shifted lateral directional behavior of the vehicle body toward an original position occur within a predetermined period of time.

6. An apparatus for an automotive vehicle as claimed in claim 3, which further comprises a condition determinator for determining whether the predetermined condition is satisfied and wherein the condition determinator comprises a vehicular lateral direction behavior determinator for determining a vehicular lateral direction behavior and wherein the damping force characteristic special mode switching block switches the present mode of operation into the fourth mode when an occurrence of a shift state of the vehicular lateral directional behavior equal to or larger than a predetermined value is determined by the vehicular lateral directional behavior determinator, releases the switching of the present mode of operation into the fourth mode after a predetermined delay time is passed from a predetermined period of time within which a returning state of the shifted vehicular lateral directional behavior toward an original position occurs, and releases the switching of the present mode of operation into the fourth mode when the returning state of the shifted vehicular lateral behavior toward the original position is not detected by the vehicular lateral directional behavior determinator within the predetermined period of time.

7. An apparatus for an automotive vehicle as claimed in claim 3, which further comprises a steering angle sensor for detecting a steering angular displacement of a steering wheel of a vehicular steering system and wherein the predetermined condition is such that a shift of the vehicular lateral directional behavior and a subsequent return of the shifted lateral directional behavior toward an original lateral directional position occur within a predetermined period of time.

8. An apparatus for an automotive vehicle as claimed in claim 3, which further comprises a vehicle speed sensor for detecting a vehicle speed and wherein the predetermined condition is such that the detected vehicle speed indicates a speed equal to or higher than a predetermined high speed value.

9. An apparatus for an automotive vehicle as claimed in claim 3, which further comprises a condition determinator for determining whether the predetermined condition is satisfied and wherein the condition determinator comprises a steering angle sensor for detecting a steering angular displacement of a steering wheel of a vehicular steering system and wherein the damping force characteristic special mode switching block switches the present mode of operation of the shock absorber into the fourth mode when a steering operation equal to or exceeding a predetermined steering angular displacement value is detected by the steering angle sensor, releases the switching of the present mode of operation into the fourth mode after a predetermined delay time has passed from a predetermined period of time within which a subsequent steering operation to return the steering wheel toward an original steering angular displacement position is detected by the steering sensor, and releases the switching of the present mode of operation when the subsequent steering operation to return the shifted steering angular displacement equal to or exceeding the predetermined angular displacement value toward the original steering angular displacement position is not detected by the steering angle sensor within the predetermined period of time.

10. An apparatus for an automotive vehicle as claimed in claim 9, which further comprises a condition determinator for determining whether the predetermined condition is satisfied, wherein the condition determinator comprises a vehicle speed sensor for detecting a vehicle speed, and wherein the damping force characteristic special mode switching block switches the present mode of operation into the fourth mode when the detected vehicle speed indicates a value equal to or higher than a predetermined high speed value.

11. An apparatus for an automotive vehicle as claimed in claim 3, wherein the vehicular vertical behavior determinator includes a vertical G sensor installed at a portion of the vehicle body adjacent to the shock absorber for detecting a vertical acceleration of the sprung mass and sprung mass vertical velocity converter for converting the sprung mass vertical acceleration into a corresponding sprung mass vertical velocity and a filter for filtering the sprung mass vertical velocity so as to extract sprung mass resonant frequency band frequency components as a sprung mass vertical velocity signal (VB).

12. An apparatus for an automotive vehicle as claimed in claim 11, wherein the damping force characteristic basic mode switching block, the damping force characteristic special mode switching block, and the sprung mass vertical velocity converter are constituted by a control unit.

13. An apparatus for an automotive vehicle as claimed in claim 3, wherein the shock absorber is so arranged and constructed as to have a first variable region interposed between the first mode of operation and the third mode of operation and in which only the damping force characteristic in the extension phase is variable at a plurality of stages between highest and lowest damping force characteristics, a second variable region interposed between the second mode of operation and the third mode of operation and in which only the damping force characteristic in the compression phase is variable at the plurality of stages between the highest and lowest damping force characteristics, and a third variable region interposed between either one of the first or second mode of operation and the fourth mode and in which the damping force characteristic in either one of the extension phase or the compression phase is variable at the plurality of stages between the highest and lowest damping force characteristics with the damping force characteristics in the other phase fixed to the relatively high damping force characteristic.

14. An apparatus for an automotive vehicle as claimed in claim 13, wherein when the damping force characteristic basic mode switching block switches the present mode of operation into the first mode, the damping force characteristic basic mode switching block causes the shock absorber to fall in the first variable region so that while the damping force characteristic in the compression phase is fixed to the relatively low damping force characteristic, the damping force characteristic in the extension phase is varied according to the vehicular vertical behavior determined by the vehicular vertical behavior determinator, when the damping force characteristic basic mode switching block switches the present mode of operation into the second mode, the damping force characteristic basic mode switching block causes the shock absorber to fall in the second variable region so that while the damping force characteristic in the extension phase is fixed to the relatively low damping force characteristic, the damping force characteristic in the compression phase is varied according to the vehicular vertical behavior determined by the vertical behavior determinator, and when the damping force characteristic special mode switching block switches the present mode of operation into the fourth mode, the damping force characteristic special mode switching block causes the shock absorber to fall in the third variable region so that while the damping force characteristic in either one of the extension or compression phase is fixed to the relatively high damping force characteristic, the other phase is varied according to the vehicular vertical behavior determined according to the vehicular vertical behavior determinator.

15. An apparatus for an automotive vehicle as claimed in claim 14, wherein the shock absorber (SA) comprises: a cylinder; a cylindrical piston rod; a piston which is attached on an outer periphery of the cylindrical piston rod, is slid on the cylinder, and defines an internal cylinder into upper and lower chambers, the piston including a piston body having a plurality of extension phase communication holes and a plurality of compression phase communication holes, both extension and compression phase communication holes communicating a working fluid between the upper and lower chambers; extension phase highly damping valve and compression phase highly damping valve, each damping valve being disposed on a corresponding one of both end surfaces of the piston body for limitedly allowing a flow of the working fluid through a corresponding one of the extension phase communication holes and the compression phase communication holes so as to generate the relatively high damping force characteristic in the corresponding one of the extension and compression phases; a control valve pivotally installed within the cylindrical piston rod; a plurality of ports formed in the cylindrical piston rod; extension phase and compression phase communication grooves formed in a tandem connection with each other on an outer periphery of the control valve; an extension phase bypass flow passage bypassing the extension phase highly damping valve and communicating the working fluid between the extension phase communicating holes and lower chamber which constitutes an extension phase lower pressure chamber; an extension phase variable throttling mechanism which is enabled to vary a flow passage cross sectional area of the extension phase bypass flow passage on the basis of a pivotal movement of the control valve; a compression phase bypass flow passage bypassing the compression phase highly damping valve and communicating the working fluid between the compression phase communication holes and the upper chamber which constitutes a compression phase low pressure chamber; a compression phase variable throttling mechanism which is enabled to vary a flow passage cross sectional area of the compression phase bypass flow passage on the basis of the pivotal movement of the control valve; a compression phase sub body and an extension phase sub body, each sub body disposed on the corresponding one of both end surfaces in the axial direction of the piston body; and a compression phase check valve and an extension phase check valve, each check valve being disposed for limitedly allowing the flow of the working fluid through a corresponding one of the extension phase bypass flow passage and the extension phase bypass flow passage so as to generate the relatively low damping force characteristic in the corresponding one of the compression and extension phases, a pivotal movement region of the control valve including the first variable region (H-S characteristic region) in which a throttle opening angle of the compression phase variable throttling mechanism is always relatively large and the throttle opening angle of the extension phase variable throttling mechanism is varied from the relatively large value to a relatively small or zero, the second variable region (S-H characteristic region) in which the throttle opening angle of the extension phase variable throttling mechanism is always relatively large and the throttle opening angle of the compression phase variable throttling mechanism is varied from the relatively large value to the relatively small or zero, the third variable region (H-H characteristic region) in which the throttle opening angle of either one of the extension phase variable throttling mechanism or the compression phase variable throttling mechanism is always relatively small or zero and the throttle opening angle of the other variable throttling mechanism is varied from the relatively large value to the relatively small or zero, and a fourth region (S-S characteristic) in which both of the throttle opening angles are always relatively large.

16. An apparatus for an automotive vehicle as claimed in claim 15, wherein the control valve is connected to an actuator for actuating the control valve to be pivoted on the axis of the piston body.

17. An apparatus for an automotive vehicle as claimed in claim 14, wherein the shock absorber (SA2) comprises: a cylinder; a cylindrical piston rod; a piston which is attached on a lower end of the cylindrical piston rod, is slid on the cylinder, and defines an internal cylinder into upper and lower chambers, the piston having an extension phase communication hole and a compression phase communication hole, both extension and compression phase communication holes communicating a working fluid between the upper and lower chambers; extension phase disc valve and compression phase highly damping valve, each disc valve being disposed on a corresponding one of the extension and compression phase communication holes of the piston for limitedly allowing a flow of the working fluid only through a corresponding one of the extension phase communication hole and the compression phase communication hole so as to generate the relatively high damping force characteristic in the corresponding one of the extension and compression phases; an extension phase bypass flow passage for bypassing the extension phase disc valve and communicating the working fluid between the upper chamber and the lower chamber during the extension phase of the shock absorber; an extension phase variable throttling mechanism which is enabled to vary a flow passage cross sectional area of the extension phase bypass flow passage; a compression phase bypass flow passage for bypassing the compression phase highly damping valve and communicating the working fluid between the lower chamber and the upper chamber; a compression phase variable throttling mechanism which is enabled to vary a flow passage cross sectional area of the compression phase bypass flow passage during the compression phase of the shock absorber; a first solenoid valve arranged for the extension phase variable throttling mechanism for actuating the extension phase variable throttling mechanism to vary the flow passage cross sectional area of the extension phase bypass flow passage; and a second solenoid valve arranged for the compression phase variable throttling mechanism for actuating the compression phase variable throttling mechanism to vary the flow passage cross sectional area of the compression phase bypass flow passage, the first and second solenoid valves being mutually driven independently of each other.

18. An apparatus for an automotive vehicle as claimed in claim 17, wherein the first and second solenoid valve are connected to a control unit constituting the damping force characteristic basic mode switching block and the damping force characteristic special mode switching block.

* * * * *